United States Patent
Youn et al.

(10) Patent No.: US 10,889,755 B2
(45) Date of Patent: Jan. 12, 2021

(54) PHOTOSENSITIVE RESIN COMPOSITION, COMPLEX, LAMINATED STRUCTURE AND DISPLAY DEVICE, AND ELECTRONIC DEVICE INCLUDING THE SAME

(71) Applicants: SAMSUNG ELECTRONICS CO., LTD, Suwon-si (KR); SAMSUNG SDI CO., LTD., Yongin-si (KR); Samsung Display Co., Ltd., Yongin-si (KR)

(72) Inventors: Jinsuop Youn, Suwon-si (KR); Ha Il Kwon, Suwon-si (KR); Misun Kim, Suwon-si (KR); Jooyeon Ahn, Suwon-si (KR); Hyeyeon Yang, Suwon-si (KR); Bumjin Lee, Suwon-si (KR); Jongmin Lee, Hwaseong-si (KR); Shin Ae Jun, Seongnam-si (KR); Hyunjoo Han, Suwon-si (KR)

(73) Assignees: SAMSUNG ELECTRONICS CO., LTD., Gyeonggi-Do (KR); SAMSUNG SDI CO., LTD., Gyeonggi-Do (KR); SAMSUNG DISPLAY CO., LTD., Gyeonggi-Do (KR)

( * ) Notice: Subject to any disclaimer, the term of this patent is extended or adjusted under 35 U.S.C. 154(b) by 445 days.

(21) Appl. No.: 15/819,556

(22) Filed: Nov. 21, 2017

(65) Prior Publication Data

US 2018/0142149 A1 May 24, 2018

(30) Foreign Application Priority Data

Nov. 22, 2016 (KR) .................. 10-2016-0155839
Nov. 2, 2017 (KR) .................. 10-2017-0145575

(51) Int. Cl.
| | | |
|---|---|---|
| C09K 11/70 | (2006.01) | |
| C09K 11/02 | (2006.01) | |
| F21V 8/00 | (2006.01) | |
| G02F 1/1335 | (2006.01) | |
| G02F 1/13357 | (2006.01) | |

(52) U.S. Cl.
CPC ............ *C09K 11/70* (2013.01); *C09K 11/025* (2013.01); *G02B 6/0073* (2013.01); *G02F 1/133514* (2013.01); *G02B 6/0053* (2013.01); *G02F 1/133617* (2013.01); *G02F 2001/133614* (2013.01)

(58) Field of Classification Search
CPC ................................ C09K 11/025; G02B 1/04
See application file for complete search history.

(56) References Cited

U.S. PATENT DOCUMENTS

| | | | |
|---|---|---|---|
| 6,319,426 B1 | 11/2001 | Bawendi et al. | |
| 8,263,639 B2 | 9/2012 | Stewart et al. | |
| 9,082,982 B2 | 7/2015 | Jun et al. | |
| 9,196,682 B2* | 11/2015 | Jang | ........................ B82Y 10/00 |
| 9,202,997 B2 | 12/2015 | Jang et al. | |
| 2015/0083970 A1 | 3/2015 | Koh et al. | |
| 2016/0215212 A1* | 7/2016 | Lee | .......................... G02B 1/04 |

FOREIGN PATENT DOCUMENTS

| | | |
|---|---|---|
| KR | 1020110039156 A | 4/2011 |
| KR | 1020130044071 A | 5/2013 |
| KR | 1020130046881 A | 5/2013 |
| KR | 1020150034013 A | 4/2015 |

\* cited by examiner

*Primary Examiner* — C Melissa Koslow
(74) *Attorney, Agent, or Firm* — Cantor Colburn LLP

(57) ABSTRACT

A photosensitive resin composition includes (A) a photo-conversion material; (B) a metal-containing compound; (C) a photopolymerizable monomer; (D) a photopolymerization initiator; and (E) a solvent, wherein the metal-containing compound includes a *—S-M-S—* (M is Zn, Al, Mg, Ca, Sc, Ti, V, Cr, Mn, Fe, Co, Ni, Cu, Zn, Ga, Sr, Y, Zr, Nb, Mo, Cd, In, Ba, Au, Hg, or Tl) structure, a complex including a polymer matrix in which a photo-conversion material is dispersed, wherein the polymer matrix includes a *—S-M-S—* (M is Zn, Al, Mg, Ca, Sc, Ti, V, Cr, Mn, Fe, Co, Ni, Cu, Zn, Ga, Sr, Y, Zr, Nb, Mo, Cd, In, Ba, Au, Hg, or Tl) structure and an ester linking group, a laminated structure including the complex, and a display device and an electronic device including the laminated structure.

23 Claims, 5 Drawing Sheets

PHOTOSENSITIVE RESIN COMPOSITION, COMPLEX, LAMINATED STRUCTURE AND DISPLAY DEVICE, AND ELECTRONIC DEVICE INCLUDING THE SAME

CROSS-REFERENCE TO RELATED APPLICATION

This application claims priority to and the benefit of Korean Patent Application No. 10-2016-0155839, filed in the Korean Intellectual Property Office on Nov. 22, 2016, and the benefit of Korean Patent Application No. 10-2017-0145575, filed in the Korean Intellectual Property Office on Nov. 2, 2017, and all the benefits accruing therefrom under 35 U.S.C. § 119, the contents of which are incorporated herein in its entirety by reference.

BACKGROUND

1. Field

This disclosure relates to a photosensitive resin composition, a complex, a laminated structure, and a display device and an electronic device including the same.

2. Description of the Related Art

A color filter applied to a display may be formed by using a photosensitive resist composition, forming a desired pattern through an exposure process by using a photomask, and then, dissolving and removing a non-exposed region through a development process. A material for the color filter may desirably have acceptable solubility in an alkali solution and may include a pigment or a dye as a color material. There remains a need in the art for a novel pigment photoluminescent-type photosensitive resin composition capable of overcoming a technological limit of a currently-used photosensitive resin composition using the pigment or the dye as a color material.

SUMMARY

An embodiment provides a photosensitive resin composition including (A) a photo-conversion material such as a quantum dot without a pigment or a dye.

An embodiment provides photo-conversion material-polymer complex manufactured from the photosensitive resin composition.

An embodiment provides a laminated structure including the photo-conversion material-polymer complex.

An embodiment provides an electronic device (e.g., a display device) including the laminated structure.

An embodiment provides a photosensitive resin composition including (A) a photo-conversion material; (B-1) a metal-containing compound; (C) a photopolymerizable monomer; (D) a photopolymerization initiator; and (E) a solvent, wherein the metal-containing compound includes a moiety represented by *—S-M-S—* wherein M is Zn, Al, Mg, Ca, Sc, Ti, V, Cr, Mn, Fe, Co, Ni, Cu, Ga, Sr, Y, Zr, Nb, Mo, Cd, In, Ba, Au, Hg, or Tl.

The metal-containing compound may include a structure represented by Chemical Formula A.

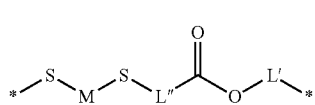

Chemical Formula A

In Chemical Formula A,

M is Zn, Al, Mg, Ca, Sc, Ti, V, Cr, Mn, Fe, Co, Ni, Cu, Ga, Sr, Y, Zr, Nb, Mo, Cd, In, Ba, Au, Hg, or Tl, and L' and L" are the same or different, and are independently a single bond or a substituted or unsubstituted C1 to C10 alkylene group.

The metal-containing compound may include a structural unit represented by Chemical Formula B.

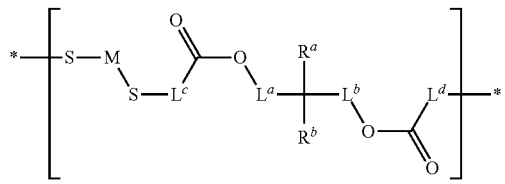

Chemical Formula B

In Chemical Formula B, $L^a$ to $L^d$ are the same or different, and are each independently a single bond or a substituted or unsubstituted C1 to C10 alkylene group, and $R^a$ and $R^b$ are the same or different, and are independently a hydrogen atom, a substituted or unsubstituted C1 to C10 alkyl group or represented by Chemical Formula C:

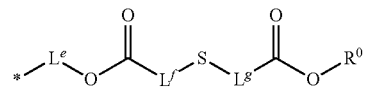

Chemical Formula C wherein, in Chemical Formula C, $L^e$ to $L^g$ are the same or different, and are each independently a single bond or a substituted or unsubstituted C1 to C10 alkylene group, and $R^0$ is a substituted or unsubstituted C1 to C20 alkyl group, a substituted or unsubstituted C3 to C20 cycloalkyl group, or a substituted or unsubstituted C7 to C20 bicycloalkyl group.

The metal-containing compound may include a structural unit represented by Chemical Formula 1.

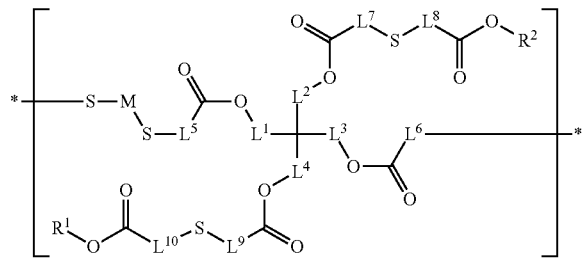

Chemical Formula 1

In Chemical Formula 1, $L^1$ to $L^{10}$ are the same or different, and are each independently a single bond or a substituted or unsubstituted C1 to C10 alkylene group, $R^1$ and $R^2$ are the same or different, and are independently a substituted or unsubstituted C1 to C20 alkyl group, a substituted or unsubstituted C3 to C20 cycloalkyl group, or a substituted or unsubstituted C7 to C20 bicycloalkyl group, and M is Zn, Al, Mg, Ca, Sc, Ti, V, Cr, Mn, Fe, Co, Ni, Cu, Zn, Ga, Sr, Y, Zr, Nb, Mo, Cd, In, Ba, Au, Hg, or Tl.

In Chemical Formula 1, M may be Zn.

The $R^1$ and $R^2$ are the same or different, and are independently represented by Chemical Formula 2A or Chemical Formula 2B.

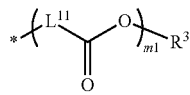

Chemical Formula 2A

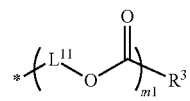

Chemical Formula 2B

In Chemical Formula 2A and Chemical Formula 2B, $L^{11}$ is a substituted or unsubstituted C1 to C10 alkylene group, $R^3$ is a substituted or unsubstituted C1 to C20 alkyl group, a substituted or unsubstituted C3 to C20 cycloalkyl group, or a substituted or unsubstituted C7 to C20 bicycloalkyl group, and m1 is an integer of 0 or 1.

The $R^1$ and $R^2$ are the same or different, and are independently represented by of Chemical Formula 2-1 to Chemical Formula 2-3.

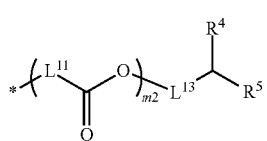

Chemical Formula 2-1

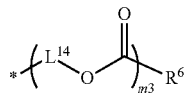

Chemical Formula 2-2

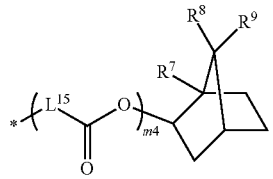

Chemical Formula 2-3

In Chemical Formula 2-1 to Chemical Formula 2-3, $L^{12}$ to $L^{15}$ are the same or different, and are each independently a substituted or unsubstituted C1 to C20 alkylene group, $R^4$ to $R^9$ are the same or different, and are each independently a substituted or unsubstituted C1 to C20 alkyl group, and m2 to m4 are the same or different, and are each independently an integer of 0 or 1.

The metal-containing compound may be represented by Chemical Formula 3.

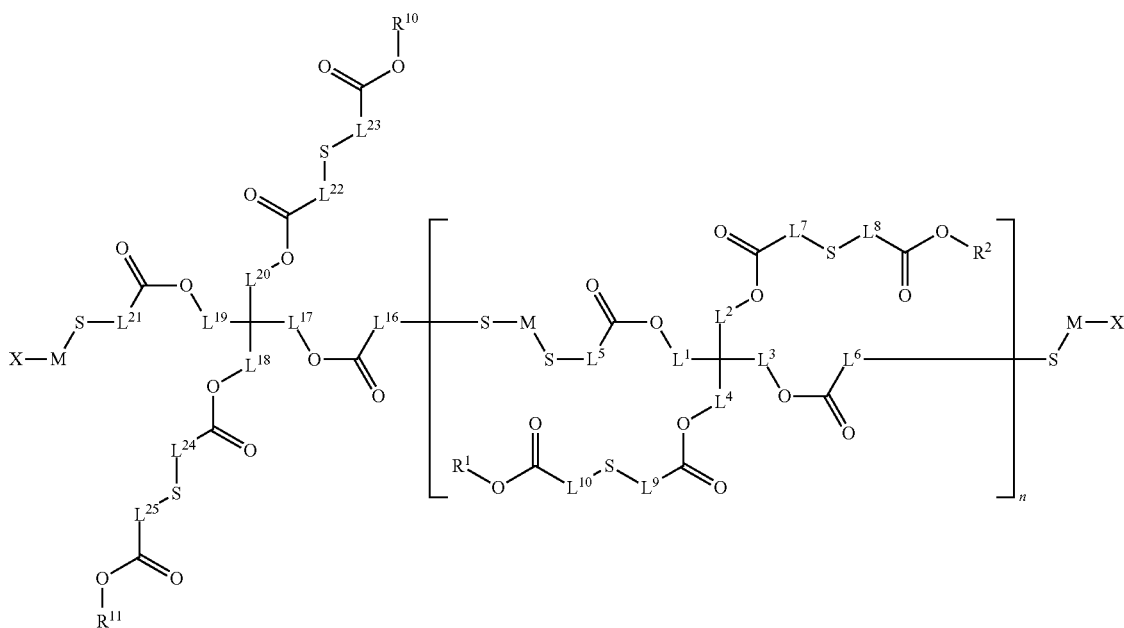

Chemical Formula 3

In Chemical Formula 3, $L^1$ to $L^{10}$ and $L^{16}$ to $L^{25}$ are the same or different, and are each independently a single bond or a substituted or unsubstituted C1 to C10 alkylene group, $R^1$, $R^2$, $R^{10}$, and $R^{11}$ are the same or different, and are each independently a substituted or unsubstituted C1 to C20 alkyl group, a substituted or unsubstituted C3 to C20 cycloalkyl group, or a substituted or unsubstituted C7 to C20 bicycloalkyl group, M is Zn, Al, Mg, Ca, Sc, Ti, V, Cr, Mn, Fe, Co, Ni, Cu, Ga, Sr, Y, Zr, Nb, Mo, Cd, In, Ba, Au, Hg, or Tl, X is F, Cl, Br, or I, and n is an integer of 1 or more (e.g., 2 or more, 3 or more and 100 or less, 50 or less, 30 or less, 20 or less, or 10 or less).

In Chemical Formula 3, M may be Zn.

The $R^1$, $R^2$, $R^{10}$, and $R^{11}$ may be the same or different, and may independently be represented by Chemical Formula 2A or Chemical Formula 2B.

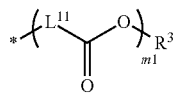

Chemical Formula 2A

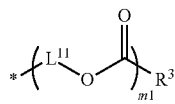

Chemical Formula 2B

In Chemical Formula 2A and Chemical Formula 2B, $L^{11}$ is a substituted or unsubstituted C1 to C10 alkylene group, $R^3$ is a substituted or unsubstituted C1 to C20 alkyl group, a substituted or unsubstituted C3 to C20 cycloalkyl group, or a substituted or unsubstituted C7 to C20 bicycloalkyl group, and m1 is an integer of 0 or 1.

The $R^1$, $R^2$, $R^{10}$, and $R^{11}$ may be the same or different, and may independently be represented by one of Chemical Formula 2-1 to Chemical Formula 2-3.

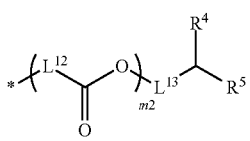

Chemical Formula 2-1

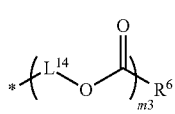

Chemical Formula 2-2

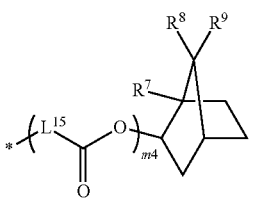

Chemical Formula 2-3

In Chemical Formula 2-1 to Chemical Formula 2-3, $L^{12}$ to $L^{15}$ are the same or different, and are each independently a substituted or unsubstituted C1 to C10 alkylene group, $R^4$ to $R^9$ are the same or different, and are each independently a substituted or unsubstituted C1 to C10 alkyl group, and m2 to m4 are the same or different, and are each independently an integer of 0 or 1.

The metal-containing compound may have a weight average molecular weight of greater than or equal to about 1,000 grams per mole (g/mol) and less than or equal to about 15,000 g/mol (e.g., about 1,500 g/mol to about 10,000 g/mol).

The metal-containing compound may surround the photo-conversion material (e.g., the surface of the photo-conversion material).

The photo-conversion material may include a sulfur atom on a surface of the photo-conversion material and a metal in the metal-containing compound may be bound to the sulfur atom on the surface of the photo-conversion material.

The photosensitive resin composition may further include (B-2) a carboxylic acid group-containing binder polymer (e.g., a carboxyl group-containing (meth)acryl-containing polymer).

The photosensitive resin composition may further include a scatterer.

The scatterer may include barium sulfate, calcium carbonate, titanium dioxide, zirconia, or a combination thereof.

The scatterer may be included in an amount of about 0.1 percent by weight (wt %) to about 20 wt % based on a total weight of the photosensitive resin composition.

The photosensitive resin composition may further include a compound having a thiol group at a terminal end of the organic thiol compound.

The photo-conversion material may include a quantum dot.

The photosensitive resin composition may include about 1 wt % to about 50 wt % of (A) the photo-conversion material; about 1 wt % to about 50 wt % (e.g., 1 wt % to 30 wt %) of (B-1) the metal-containing compound; about 0.1 wt % to about 30 wt % of (C) the photopolymerizable monomer; about 0.1 wt % to about 10 wt % of (D) the photopolymerization initiator; and a balance amount of (E) the solvent based on a total weight of the photosensitive resin composition.

The photosensitive resin composition may further include malonic acid; 3-amino-1,2-propanediol; a silane coupling agent; a leveling agent; fluorine surfactant; or a combination thereof.

The photosensitive resin composition may have an initial viscosity of greater than or equal to about 1 centipoise (cPs) and less than or equal to about 100 cPs at 25° C.

The photosensitive resin composition may have a viscosity increase of less than or equal to about 10% relative to an initial viscosity after standing at 25° C. for 120 hours.

In an embodiment, a complex includes a polymer matrix and a photo-conversion material (e.g., a plurality of quantum dots) dispersed in the polymer matrix, wherein the polymer matrix includes a moiety represented by *—S-M-S—* wherein M is Zn, Al, Mg, Ca, Sc, Ti, V, Cr, Mn, Fe, Co, Ni, Cu, Zn, Ga, Sr, Y, Zr, Nb, Mo, Cd, In, Ba, Au, Hg, or Tl, and an ester linking group.

The moiety represented by *—S-M-S—* may be bound to the photo-conversion material.

In an embodiment, a laminated structure includes a substrate and photo-conversion layer disposed on the substrate, wherein the photo-conversion layer includes at least one repetitive section emitting light in a predetermined wavelength and the repetitive section includes the complex.

The repetitive section may include a first section configured to emit first light.

The repetitive section may include a second section configured to emit second light that is different from the first light.

The photo-conversion layer may further include a third section configured to emit or transmit third light.

Another embodiment provides an electronic device including the laminated structure.

The electronic device may be a light emitting diode (LED), an organic light emitting diode (OLED), a sensor such as an image sensor, a solar cell, or a display device such as a liquid crystal display (LCD) device.

An embodiment provides a display device (e.g., a liquid crystal display (LCD) device) including the laminated structure and a light source configured to supply the laminated structure with incident light.

The light source may be an organic light emitting diode.

Embodiments are included in the following detailed description.

A photosensitive resin composition having excellent heat resistance, chemical resistance, and a photo-conversion maintenance rate may be provided by using a photo-conversion material such as a quantum dot instead of a pigment or a dye conventionally used as a color material and luminous efficiency deterioration may be minimized and a color filter having an excellent photo-conversion maintenance rate may be provided by using this photosensitive resin composition.

DETAILED DESCRIPTION

Figure 1:
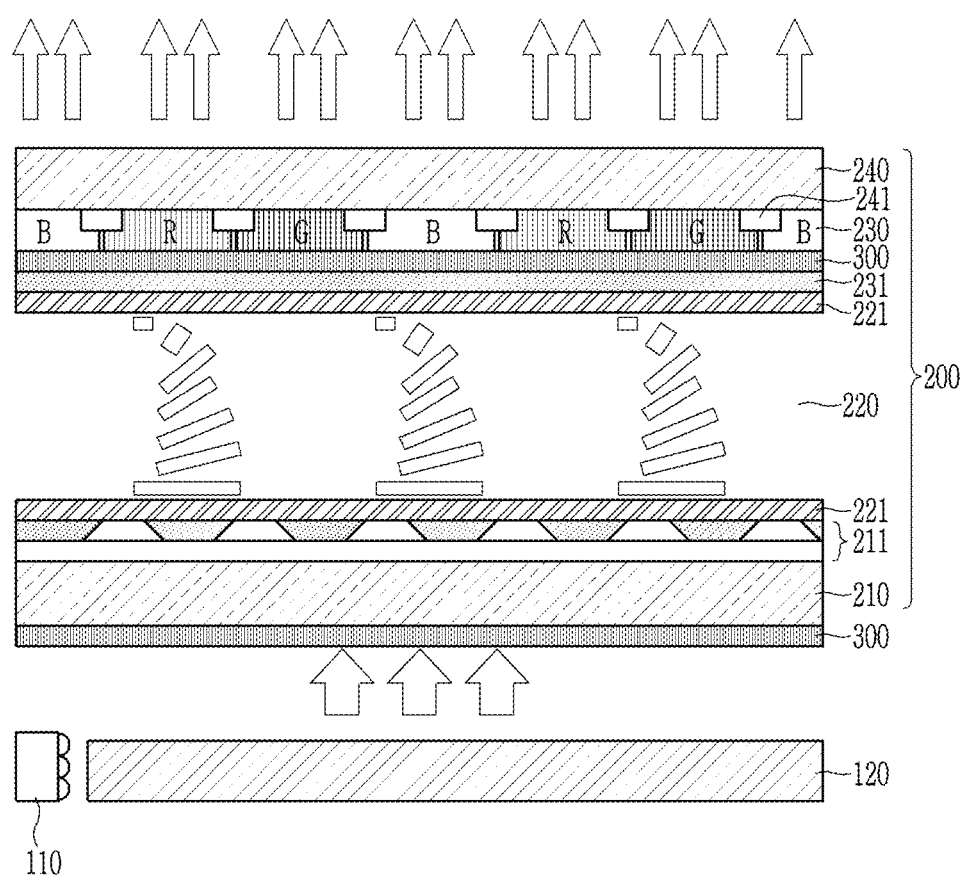
FIG. 1 is a cross-sectional view of an embodiment showing an electronic device.

Hereinafter, embodiments are described in detail. However, these embodiments are exemplary, the present invention is not limited thereto, and the present invention is defined by the scope of claims.

Advantages and characteristics of this disclosure, and a method for achieving the same, will become evident referring to the following example embodiments together with the drawings attached hereto. However, the embodiments should not be construed as being limited to the embodiments set forth herein. Unless otherwise defined, all terms used in the specification (including technical and scientific terms) may be used with meanings commonly understood by a person having ordinary knowledge in the art. The terms defined in a generally-used dictionary may not be interpreted ideally or exaggeratedly unless clearly defined. In addition, unless explicitly described to the contrary, the word "comprise" and variations such as "comprises" or "comprising", will be understood to imply the inclusion of stated elements but not the exclusion of any other elements.

Further, the singular includes the plural unless mentioned otherwise.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, when a specific definition is not otherwise provided, the term "alkyl group" refers to a C1 to C20 alkyl group, the term "alkenyl group" refers to a C2 to C20 alkenyl group, the term "cycloalkenyl group" refers to a C3 to C20 cycloalkenyl group, the term "heterocycloalkenyl group" refers to a C3 to C20 heterocycloalkenyl group, the term "aryl group" refers to a C6 to C20 aryl group, the term "arylalkyl group" refers to a C6 to C20 arylalkyl group, the term "alkylene group" refers to a C1 to C20 alkylene group, the term "arylene group" refers to a C6 to C20 arylene group, the term "alkylarylene group" refers to a C6 to C20 alkylarylene group, the term "heteroarylene group" refers to a C3 to C20 heteroarylene group, and the term "alkoxylene group" refers to a C1 to C20 alkoxylene group.

As used herein, when a specific definition is not otherwise provided, the term "substituted" may refer to substitution with a halogen atom (F, Cl, Br, I), a hydroxy group, a C1 to C20 alkoxy group, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C20 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, a C3 to C20 heteroaryl group, or a combination thereof, instead of at least one hydrogen.

As used herein, when a specific definition is not otherwise provided, the term "hetero" may refer to a group substituted with at least one hetero atom of N, O, S, and P, in a chemical formula.

As used herein, when a specific definition is not otherwise provided, "(meth)acrylate" refers to both "acrylate" and "methacrylate", and "(meth)acrylic acid" refers to "acrylic acid" and "methacrylic acid". Also as used herein, when a specific definition is not otherwise provided, "(meth)acryl" includes any one or more of acrylate, methacrylate, acrylic acid, and methacrylic acid.

As used herein, when a specific definition is not otherwise provided, the term "combination" refers to mixing or copolymerization.

As used herein, when a specific definition is otherwise provided, a hydrogen atom is bonded at the position when a chemical bond is not drawn where supposed to be given.

As used herein, when a specific definition is not otherwise provided, "*" indicates a point where the same or different atom or Chemical Formula is linked.

A conventional color filter layer may include a dye and a pigment as a color filter material. The pigment may not be well dispersed in a solvent and may deteriorate luminance of a display device, and the dye may lack heat resistance and chemical resistance. The dye and the pigment are absorption-type color filter materials and may inevitably substantially reduce photo-efficiency.

A quantum dot is a photo-conversion material and may realize luminous efficiency (quantum efficiency, quantum yield) near 100%. The quantum dot is extensively applied to various displays besides televisions (TVs) and LEDs, electronic devices, and the like. However, technology of patterning the photo-conversion material such as the quantum dot and like has not been developed, and accordingly, the photo-conversion material such as the quantum dot and the like is not extensively applied to a color filter layer. Currently, a photosensitive resin composition including a photo-conversion material having desired pattern formality (providing a color filter layer of a photo-conversion material such as a quantum dot) may not be obtained. In addition, photo-efficiency of the photo-conversion material such as the quantum dot may not be easy to maintain in a patterning process of using a composition including the photo-conversion material (e.g., an exposure process, a development process, a washing process, a heating process such as prebaking and postbaking, and the like).

A photosensitive resin composition according to an embodiment includes (A) a photo-conversion material; (B-1) a metal-containing compound; (C) a photopolymerizable monomer; (D) a photopolymerization initiator; and (E) a solvent, wherein the metal-containing compound includes a moiety represented by *—S-M-S—* (M is Zn, Al, Mg, Ca, Sc, Ti, V, Cr, Mn, Fe, Co, Ni, Cu, Ga, Sr, Y, Zr, Nb, Mo, Cd, In, Ba, Au, Hg, or Tl). The metal-containing compound may passivate the photo-conversion material effectively, which may prevent/suppress a decrease in luminous efficiency and thus may improve luminous efficiency. The metal-containing compound includes a multi-functional metal-sulfur complex ligand represented by *—S-M-S—* and may protect the photo-conversion material and improve chemical resistance and heat resistance.

Hereinafter, each component is specifically described.

(A) Photo-Conversion Material

The photo-conversion material may absorb light of a wavelength of about 360 nanometers (nm) to about 780 nm (e.g., greater than or equal to about 400 nm, greater than or equal to about 420 nm, greater than or equal to about 450 nm, greater than or equal to about 460 nm, or greater than or equal to about 470 nm and less than or equal to about 780 nm, less than or equal to about 700 nm, less than or equal to about 650 nm, less than or equal to about 600 nm, less than or equal to about 550 nm, less than or equal to about 500 nm, or less than or equal to about 480 nm), and may emit light (e.g., fluorescence) of a wavelength that is different from the absorption wavelength (e.g., longer than the absorption wavelength). For example, the photo-conversion material may absorb blue light (e.g., greater than or equal to about 450 nm and less than or equal to about 480 nm) and may emit light in a longer wavelength (e.g., greater than or equal to about 500 nm and less than or equal to about 700 nm) than the absorption wavelength, for example green light of about 500 nm to about 580 nm or red light of about 600 nm to about 680 nm. The photo-conversion material may have a photoluminescence peak wavelength of about 500 nm to about 680 nm. In an embodiment, the photo-conversion material may be a particle having a nano-size. The photo-conversion material may include a plurality of quantum dots.

The quantum dot (hereinafter, referred to as a semiconductor nanocrystal particle) is not particularly limited and may be known or commercially available. For example, the quantum dot may include a Group II-VI compound, a Group III-V compound, a Group IV-VI compound, a Group IV element or compound, a Group I-III-VI compound, a Group I-II-IV-VI compound, or a combination thereof.

Examples of the Group II-VI compound include a binary element compound including CdSe, CdTe, ZnS, ZnSe, ZnTe, ZnO, HgS, HgSe, HgTe, MgSe, MgS, and a combination thereof; a ternary element compound including CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a combination thereof; and a quaternary element compound including HgZnTeS, CdZnSeS, CdZnSeTe, CdZnSTe, CdHgSeS, CdHgSeTe, CdHgSTe, HgZnSeS, HgZnSeTe, HgZnSTe, and a combination thereof. examples of the Group III-V compound may include a binary element compound including GaN, GaP, GaAs, GaSb, AlN, AlP, AlAs, AlSb, InN, InP, InAs, InSb, and a combination thereof; a ternary element compound including GaNP, GaNAs, GaNSb, GaPAs, GaPSb, AlNP, AlNAs, AlNSb, AlPAs, AlPSb, InNP, InNAs, InNSb, InPAs, InPSb, and a combination thereof; and a quaternary element compound including GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a combination thereof. The Group IV-VI compound may include a binary element compound including SnS, SnSe, SnTe, PbS, PbSe, PbTe, and a combination thereof; a ternary element compound including SnSeS, SnSeTe, SnSTe, PbSeS, PbSeTe, PbSTe, SnPbS, SnPbSe, SnPbTe, and a combination thereof; and a quaternary element compound including SnPbSSe, SnPbSeTe, SnPbSTe, and a combination thereof. Examples of the Group I-III-VI compound may include $CuInSe_2$, $CuInS_2$, CuInGaSe, and CuInGaS but are not limited thereto. Examples of the Group I-II-IV-VI compound may include CuZnSnSe and CuZnSnS, but are not limited thereto. The Group IV compound may be a single substance compound including Si, Ge, and a combination thereof; and a binary element compound including SiC, SiGe, and a combination thereof. The Group III-V compound may further include a Group II metal (e.g., InZnP, etc.)

The binary element compound, the ternary element compound, or the quaternary element compound respectively exist in a uniform concentration in the semiconductor nanocrystal particle or partially different concentrations in the same particle. In the semiconductor nanocrystal, a material composition of a shell may have a larger energy bandgap than that of a core. In the semiconductor nanocrystal, a material composition of a core may have a larger energy bandgap than that of a shell. In the case of a multi-shell type of semiconductor nanocrystal particle, an outer shell may have a larger energy bandgap than that of a shell that is closer to the core.

The quantum dot may have a particle diameter (an average largest particle diameter for a non-spherical shape) of about 1 nm to about 100 nm. In an embodiment, the quantum dot may have a particle diameter (an average largest particle diameter for a non-spherical shape) of about 1 nm to about 50 nm, for example about 2 nm to about 29 nm, about 1 nm to about 20 nm, for example, 2 nm (or 3 nm) to 15 nm. In an embodiment, the quantum dot may have a size of less than or equal to about 20 nm, for example less than or equal to about 10 nm, less than or equal to about 9 nm, less than or equal to about 8 nm, or less than or equal to about 7 nm.

The shape of the quantum dot may have a generally-used shape in the art but is not particularly limited. For example, the quantum dot may have spherical, pyramidal, multi-armed, or cubic nanoparticles, nanotubes, nanowires, nanofibers, nanosheets, or a combination thereof.

The quantum dot may be commercially available or may be synthesized according to any method. For example, several nano-sized quantum dots may be synthesized according to a wet chemical process. In the wet chemical process, precursors react in an organic solvent to grow nanocrystal particles, and the organic solvent or a ligand compound may coordinate, e.g., be bound to, the surface of the semiconductor nanocrystal, controlling the growth of the crystal. Examples of the organic solvent and ligand compound are known. Excess organic materials that are not coordinated on the surface of the nanocrystal may be removed by pouring the nanocrystal in excess non-solvent, and centrifuging the resulting mixture. Examples of the non-solvent may be acetone, ethanol, methanol, and the like, but are not limited thereto.

The quantum dot may have an organic ligand bound on the surface. The organic ligand may have a hydrophobic moiety. In an embodiment, the organic ligand having the hydrophobic moiety may include RCOOH, $RNH_2$, $R_2NH$, $R_3N$, RSH, $R_3PO$, $R_3P$, ROH, RCOOR', $RPO(OH)_2$, $R_2POOH$ (wherein, R and R' are the same or different, and are independently a C5 to C24 aliphatic hydrocarbon group, for example, a substituted or unsubstituted alkyl, a substituted or unsubstituted alkenyl, or a C5 to C20 aromatic hydrocarbon group, for example, a substituted or unsubstituted aryl group), or a combination thereof.

Examples of the organic ligand compound may be thiol compounds such as methane thiol, ethane thiol, propane thiol, butane thiol, pentane thiol, hexane thiol, octane thiol, dodecane thiol, hexadecane thiol, octadecane thiol, or benzyl thiol; amines such as methane amine, ethane amine, propane amine, butane amine, pentyl amine, hexyl amine, octyl amine, nonylamine, decylamine, dodecyl amine, hexadecyl amine, octadecyl amine, dimethyl amine, diethyl amine, dipropyl amine, tributylamine, trioctylamine, and the like; carboxylic acid compounds such as methanoic acid, ethanoic acid, propanoic acid, butanoic acid, pentanoic acid, hexanoic acid, heptanoic acid, octanoic acid, dodecanoic acid, hexadecanoic acid, octadecanoic acid, oleic acid, benzoic acid, and the like; phosphine compounds such as methylphosphine, ethylphosphine, propylphosphine, butylphosphine, pentylphosphine, octylphosphine, dioctylphosphine, tributylphosphine, trioctylphosphine, diphenylphosphine, triphenylphosphine, and the like; phosphine oxide compounds such as methylphosphine oxide, ethylphosphine oxide, propylphosphine oxide, butylphosphine oxide, pentylphosphine oxide, tributylphosphine oxide, octylphosphine oxide, dioctylphosphine oxide, trioctylphosphine oxide, diphenylphosphine oxide, triphenylphosphine oxide and the like; and C5 to C20 alkyl phosphonic acid such as hexylphosphonic acid, octylphosphonic acid, dodecylphosphonic acid, tetradecylphosphonic acid, hexadecylphosphonic acid, octadecylphosphonic acid; and the like, but are not limited thereto. The quantum dot may include the organic ligand alone or in a mixture of one or more.

The quantum dot may have quantum efficiency of greater than or equal to about 10%, for example, greater than or equal to about 30%, greater than or equal to about 50%, greater than or equal to about 60%, greater than or equal to about 70%, greater than or equal to about 90%, or even about 100%. In addition, the quantum dot may exhibit a narrow photoluminescence spectrum. For example, the quantum dot may have a full width at half maximum (FWHM) of less than or equal to about 45 nm, for example less than or equal to about 40 nm, or less than or equal to about 30 nm. The quantum dot may emit light in wavelength ranges of ultraviolet (UV) to visible ray or even near infrared ray or more by changing sizes and compositions. For example, the quantum dot may emit light in a wavelength of about 300 nm to about 700 nm or about 700 nm or greater, but is not limited thereto.

An electronic device including a quantum dot having the aforementioned photoluminescence characteristics (e.g., a quantum dot-containing display device) may realize improved luminance and improved color purity or color reproducibility. However, the luminescence characteristics of the quantum dot may be easily deteriorated by an external environment/stimulus (e.g., air, moisture, heat, and the like), and in order to apply the quantum dot to a device, stability of the quantum dot in terms of photoluminescence property may desirably be improved.

The quantum dot according to an embodiment may not include cadmium.

For example, the quantum dot may include a red light emitting quantum dot, a green light emitting quantum dot, or a combination thereof. The red quantum dot may have a larger average particle diameter than the green quantum dot, but is not limited thereto.

On the other hand, for dispersion stability of the quantum dot, a photosensitive resin composition according to an embodiment may further include a dispersing agent. The dispersing agent may help uniformly disperse a photoconversion material such as a quantum dot in the photosensitive resin composition and may include a non-ionic, anionic, or cationic dispersing agent. Specifically, the dispersing agent may be a polyalkylene glycol or esters thereof, a polyoxyalkylene, a polyhydric alcohol ester-alkylene oxide addition product, an alcohol-alkylene oxide addition product, a sulfonate ester, a sulfonate salt, a carboxylate ester, a carboxylate salt, an alkyl amide-alkylene oxide addition product, an alkyl amine, or the like. They may be used alone or in a mixture of two or more. The dispersing agent may be used in an amount of about 0.1 wt % to about 100 wt %, for example about 10 wt % to about 20 wt % relative to a solid content of the photo-conversion material.

The photo-conversion material may be included in an amount of greater than or equal to about 1 wt %, greater than or equal to about 3 wt %, greater than or equal to about 5 wt %, greater than or equal to about 7 wt %, greater than or equal to about 9 wt %, or greater than or equal to about 10 wt % based on a total amount of the photosensitive resin composition according to an embodiment. The photo-conversion material may be included in an amount of less than or equal to about 50 wt %, less than or equal to about 47 wt %, less than or equal to about 45 wt %, less than or equal to about 40 wt %, less than or equal to about 37 wt %, less than or equal to about 35 wt %, less than or equal to about 30 wt %, less than or equal to about 25 wt %, less than or equal to about 20 wt %, less than or equal to about 19 wt %, less than or equal to about 17 wt %, or less than or equal to about 15 wt % based on a total amount of the photosensitive resin composition according to an embodiment. The photo-conversion material may be included in an amount of about 1 wt % to about 50 wt %, for example about 10 wt % to about 30 wt % based on a total amount of the photosensitive resin composition according to an embodiment. When the photo-conversion material is included within these ranges, a photo-conversion rate may be improved and pattern characteristics and development characteristics are not inhibited and thus excellent processibility may be provided.

(B-1) Metal-Containing Compound

A photosensitive resin composition according to an embodiment includes a metal-containing compound. The metal-containing compound may include a metal-sulfur complex ligand. The metal-sulfur complex ligand may be represented by *—S-M-S—* (M is Zn, Al, Mg, Ca, Sc, Ti, V, Cr, Mn, Fe, Co, Ni, Cu, Ga, Sr, Y, Zr, Nb, Mo, Cd, In, Ba, Au, Hg, or Tl).

The metal-sulfur complex ligand may be a multi-functional ligand. Without being bound by any particular theory, the metal-sulfur complex ligand may effectively and stably protect the photo-conversion material (simultaneously, passivate a metal/sulfur dangling bond of the photo-conversion material). Without being bound by any particular theory, the photo-conversion material such as the quantum dot and the like may show improved heat resistance and chemical resistance due to the passivation of the metal-sulfur complex ligand and form a photosensitive resin composition widely and stably usable regardless of a photoresist composition.

The photo-conversion material (e.g., a quantum dot) including a well-known organic ligand may be seriously aggregated when mixed with other components of the photosensitive resin composition. Herein, viscosity of the composition may be rapidly increased, and process stability is difficult to secure. The well-known organic ligand may not sufficiently passivate a metal site on the surface of the photo-conversion material.

Without being bound by any particular theory, the metal-sulfur complex ligand included in a metal-containing compound according to an embodiment may simultaneously passivate a metal/sulfur dangling bond of the photo-conversion material and thus improve the above problem. The photosensitive resin composition including the metal-containing compound and the photo-conversion material may show improved properties (heat resistance, chemical resistance) and improved processibility and thus prevent/suppress photo-efficiency deterioration of the photo-conversion material during preparation of a complex. The improved processibility of the photosensitive resin composition may contribute to improving a pattern profile and storage stability of a formulation. A photosensitive resin composition for a color filter requires developability, storage at room temperature, and redissolubility. The photosensitive resin composition according to an embodiment includes the metal-containing compound and thus may secure the required characteristics such as developability, storage at room temperature, redissolubility, and the like.

During preparation of the quantum dot-containing photosensitive resin composition, the mixing of a quantum dot with other components (including a photoresist) and the exposing and curing the mixture may substantially deteriorate photo-efficiency of the quantum dot. Without being bound by any particular theory, in the composition according to an embodiment, a metal (e.g., zinc) and a sulfur-dangling bond on the surface of the photo-conversion material such as a quantum dot and the like may be simultaneously passivated/encapsulated by the metal-containing compound, and accordingly, a side reaction between the photo-conversion material and other components in the photosensitive resin composition may be effectively suppressed.

The metal-containing compound may include a structure represented by Chemical Formula A. For example, the ligand represented by *—S-M-S—* structure may be represented by Chemical Formula A.

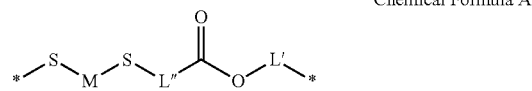

Chemical Formula A

In Chemical Formula A,

M is Zn, Al, Mg, Ca, Sc, Ti, V, Cr, Mn, Fe, Co, Ni, Cu, Ga, Sr, Y, Zr, Nb, Mo, Cd, In, Ba, Au, Hg, or Tl, and L' and L" are the same or different, and are independently a single bond or a substituted or unsubstituted C1 to C10 alkylene group.

The metal-containing compound may include a structural unit represented by Chemical Formula B. For example, the ligand represented by the *—S-M-S—* structure may be represented by Chemical Formula B.

Chemical Formula B

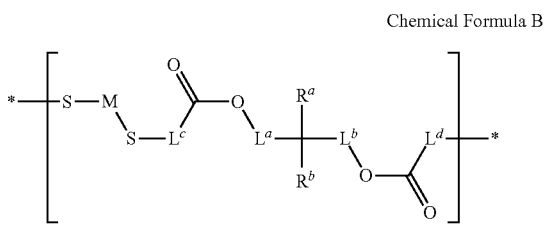

In Chemical Formula B, $L^a$ to $L^d$ are the same or different, and are each independently a single bond or a substituted or unsubstituted C1 to C10 alkylene group, $R^a$ and $R^b$ are the same or different, and are independently a hydrogen atom, a substituted or unsubstituted C1 to C10 alkyl group or represented by Chemical Formula C:

Chemical Formula C

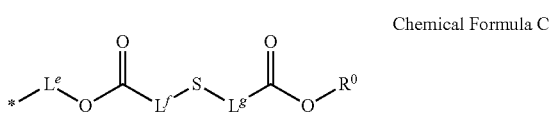

In Chemical Formula C, $L^e$ to $L^g$ are the same or different, and are each independently a single bond or a substituted or unsubstituted C1 to C10 alkylene group, and $R^0$ is a substituted or unsubstituted C1 to C20 alkyl group, a substituted or unsubstituted C3 to C20 cycloalkyl group, or a substituted or unsubstituted C7 to C20 bicycloalkyl group.

The metal-containing compound may include a structural unit represented by Chemical Formula 1. For example, the ligand represented by the *—S-M-S—* structure may be represented by Chemical Formula 1.

Chemical Formula 1

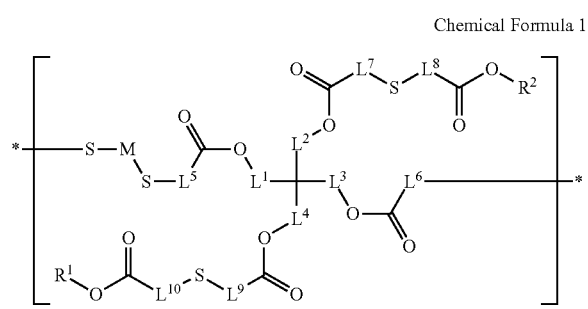

In Chemical Formula 1, $L^1$ to $L^{10}$ are the same or different, and are independently a single bond or a substituted or unsubstituted C1 to C10 alkylene group, $R^1$ and $R^2$ are the same or different, and are independently a substituted or unsubstituted C1 to C20 alkyl group, a substituted or unsubstituted C3 to C20 cycloalkyl group, or a substituted or unsubstituted C7 to C20 bicycloalkyl group, and M is Zn, Al, Mg, Ca, Sc, Ti, V, Cr, Mn, Fe, Co, Ni, Cu, Ga, Sr, Y, Zr, Nb, Mo, Cd, In, Ba, Au, Hg, or Tl.

In an embodiment, the M may be Zn.

The $R^1$ and $R^2$ may be the same or different, and may independently be represented by Chemical Formula 2A or Chemical Formula 2B.

Chemical Formula 2A

Chemical Formula 2B

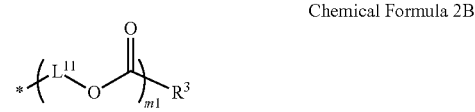

In Chemical Formula 2A and Chemical Formula 2B, $L^{11}$ is a substituted or unsubstituted C1 to C10 alkylene group, $R^3$ is a substituted or unsubstituted C1 to C20 alkyl group, a substituted or unsubstituted C3 to C20 cycloalkyl group, or a substituted or unsubstituted C7 to C20 bicycloalkyl group, and m1 is an integer of 0 or 1.

Specifically, the $R^1$ and $R^2$ may be the same or different, and may independently be represented by one of Chemical Formula 2-1 to Chemical Formula 2-3.

Chemical Formula 2-1

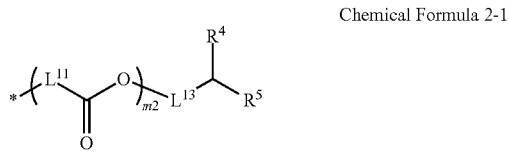

Chemical Formula 2-2

Chemical Formula 2-3

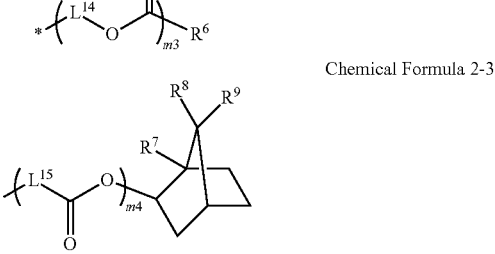

In Chemical Formula 2-1 to Chemical Formula 2-3, $L^{12}$ to $L^{15}$ are the same or different, and are each independently a substituted or unsubstituted C1 to C10 alkylene group, $R^4$ to $R^9$ are the same or different, and are each independently a substituted or unsubstituted C1 to C20 alkyl group, and m2 to m4 are the same or different, and are each independently an integer of 0 or 1.

The metal-containing compound may be represented by Chemical Formula 3.

Chemical Formula 3

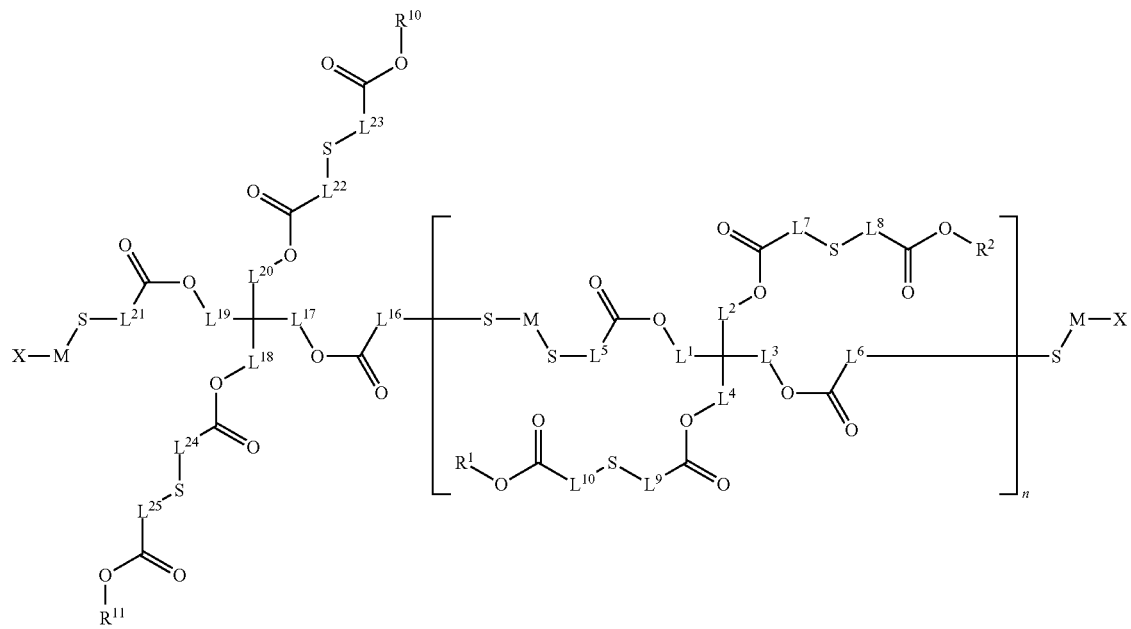

In Chemical Formula 3, $L^1$ to $L^{10}$ and $L^{16}$ to $L^{25}$ are the same or different, and are each independently a single bond or a substituted or unsubstituted C1 to C10 alkylene group, $R^1$, $R^2$, $R^{10}$, and $R^{11}$ are the same or different, and are each independently a substituted or unsubstituted C1 to C20 alkyl group, a substituted or unsubstituted C3 to C20 cycloalkyl group, or a substituted or unsubstituted C7 to C20 bicycloalkyl group, M is Zn, Al, Mg, Ca, Sc, Ti, V, Cr, Mn, Fe, Co, Ni, Cu, Zn, Ga, Sr, Y, Zr, Nb, Mo, Cd, In, Ba, Au, Hg, or Tl, X is F, Cl, Br, or I, and n is an integer ranging from 1 to 100.

For example, in Chemical Formula 3, M may be Zn.

In Chemical Formula 3, $R^1$, $R^2$, $R^{10}$, and $R^{11}$ may be the same or different, and may independently be represented by Chemical Formula 2A or Chemical Formula 2B.

More specifically, in Chemical Formula 3, $R^1$, $R^2$, $R^{10}$, and $R^{11}$ may be the same or different, and may independently be represented by represented by one of Chemical Formula 2-1 to Chemical Formula 2-3.

The metal-containing compound and the photo-conversion material may be bound to each other. In an embodiment, the metal-containing compound may surround the surface of the photo-conversion material (e.g., may encapsulate the surface of the photo-conversion material). The photo-conversion material may include a sulfur atom on the surface, and the sulfur atom is bonded with a metal in the metal-containing compound. The metal-containing compound may play a role of an additive stabilizing the photo-conversion material. In an embodiment, in order to bond the metal-containing compound with the photo-conversion material, a dispersion including the photo-conversion material and the metal-containing compound by using an appropriate organic solvent may be stirred at a predetermined temperature (e.g., greater than or equal to about 40° C. or greater than or equal to about 50° C. and less than or equal to about 90° C.) for predetermined time (e.g., greater than or equal to about 10 minutes or greater than or equal to about 1 hour) but is not limited thereto.

The photo-conversion material is encapsulated/passivated on the surface by the metal-containing compound and thus may show improved dispersity. The encapsulated photo-conversion material (e.g., a plurality of encapsulated quantum dots) may be dispersed in a medium without causing a serious aggregation. In an embodiment, a plurality of quantum dots may be present without forming a cluster. In an embodiment, an appropriate number of quantum dots may be bonded by the metal-containing compound and thus form a cluster.

The metal-containing compound is a reaction product of an organic/inorganic metal salt including the metal M, a multithiol compound including two or more thiol groups, and an ene compound having a carbon-carbon double bond (e.g., a compound having one (meth)acryl group or vinyl group).

The metal salt may include a metal chloride, metal acrylate, metal methacrylate, metal diethyldithiocarbamate, metal acetate, metal propionate, metal butyrate, metal valerate, and metal carboxyethyl (meth)acrylate, but is not limited thereto. The thiol compound may include a dithiol compound, a trithiol compound, a tetrathiol compound (described in more detail below), a pentathiol compound, a hexathiol compound, or other polythiol compound. The ene compound may be a mono(meth)acrylate compound (e.g., isobornyl (meth)acrylate, ethylhexyl acrylate, etc.) having a C1 to C30 aliphatic/alicyclic hydrocarbon ester group, a vinyl acetate having a C1 to C30 aliphatic/alicyclic hydrocarbon group, or a combination thereof. Reaction conditions (reaction temperature/time) for synthesizing the metal-containing compound are not particularly limited and may be selected appropriately. The reaction temperature may be about 40° C. to about 70° C., but is not limited thereto. The reaction time may be greater than or equal to about 30 minutes, or greater than or equal to about 1 hour, but is not limited thereto.

In the composition according to an embodiment, the metal-containing compound may protect the photo-conversion material such as the quantum dot and the like and thus prevent/suppress a luminous efficiency decrease of the photo-conversion material such as a quantum dot during a color filter process including prebaking (PRB), exposure, development, washing, and post-baking (POB, performed at a relatively high temperature of greater than or equal to about 180° C.). The metal-containing compound may prevent luminous efficiency (quantum efficiency, quantum yield) deterioration of the quantum dot and stabilize the quantum dot. A thiol ligand having strong affinity for the surface of the quantum dot may passivate a defect or a free bond on the surface of each quantum dot and stabilize the quantum dot (e.g., individually or as a cluster). Accordingly, the composition according to an embodiment may provide a photo-conversion material-polymer complex pattern having improved photo-efficiency.

Without being bound by any particular theory, the metal-containing compound passivating the photo-conversion material in the photosensitive resin composition is thought to react with a photopolymerizable monomer activated by a photopolymerization initiator which will be described below during the color filter process.

A weight average molecular weight of the metal-containing compound may be about 1,000 g/mol to about 15,000 g/mol, for example about 1,500 g/mol to about 10,000 g/mol, for example about 2,000 g/mol to about 5,000 g/mol. When the weight average molecular weight of the metal-containing compound is within these ranges, a close contacting property with a substrate may be improved, physicochemical properties may be good, and viscosity may be acceptable.

In an embodiment, an initial viscosity of the composition may be greater than or equal to about 1 cPs, for example, greater than or equal to about 2 cPs, greater than or equal to about 3 cPS, or greater than or equal to about 4 cPs at 25° C. In an embodiment, an initial viscosity of the composition may be less than or equal to about 100 cPS, for example, less than or equal to about 90 cPs, less than or equal to about 80 cPs, less than or equal to about 70 cPs, less than or equal to about 60 cPs, less than or equal to about 50 cPs, less than or equal to about 40 cPs, less than or equal to about 30 cPs, less than or equal to about 20 cPs, less than or equal to about 15 cPs, less than or equal to about 14 cPs, less than or equal to about 13 cPs, less than or equal to about 12 cPs, less than or equal to about 11 cPs, less than or equal to about 10 cPs, less than or equal to about 9 cPs, or less than or equal to about 8 cPs at 25° C. The composition according to an embodiment may exhibit improved stability. Accordingly, the composition according to an embodiment may exhibit a viscosity variation (e.g., increase) of less than or equal to about 10%, for example, 9%, less than or equal to about 8%, less than or equal to about 7%, less than or equal to about 6%, or less than or equal to about 5% relative to an initial viscosity after standing at 25° C. for 120 hours.

The metal-containing compound may be included in an amount of greater than or equal to about 1 wt %, greater than or equal to about 2 wt %, greater than or equal to about 3 wt %, greater than or equal to about 4 wt %, greater than or equal to about 5 wt %, greater than or equal to about 7 wt %, or greater than or equal to about 9 wt % based on a total amount of the photosensitive resin composition according to an embodiment. The metal-containing compound may be included in an amount of less than or equal to about 50 wt %, less than or equal to about 47 wt %, less than or equal to about 45 wt %, less than or equal to about 40 wt %, less than or equal to about 37 wt %, less than or equal to about 35 wt %, less than or equal to about 30 wt %, less than or equal to about 29 wt %, less than or equal to about 28 wt %, less than or equal to about 27 wt %, less than or equal to about 26 wt %, less than or equal to about 25 wt %, less than or equal to about 24 wt %, less than or equal to about 23 wt %, less than or equal to about 22 wt %, less than or equal to about 20 wt %, less than or equal to about 19 wt %, less than or equal to about 18 wt %, less than or equal to about 17 wt %, less than or equal to about 16 wt %, less than or equal to about 15 wt %, less than or equal to about 14 wt %, less than or equal to about 13 wt %, less than or equal to about 12 wt %, less than or equal to about 11 wt %, less than or equal to about 10 wt %, less than or equal to about 9 wt %, less than or equal to about 8 wt %, less than or equal to about 7 wt %, less than or equal to about 6 wt %, less than or equal to about 5 wt %, less than or equal to about 4 wt %, or less than or equal to about 3 wt % based on a total amount of the photosensitive resin composition according to an embodiment.

The metal-containing compound may be included in an amount of about 1 wt % to about 50 wt %, for example about 3 wt % to about 30 wt %, or about 2 wt % to about 25 wt % based on a total amount of photosensitive resin composition. When the metal-containing compound is included within these ranges, excellent sensitivity, developability, resolution, and linearity of pattern may be obtained.

(B-2) Carboxylic Acid Group-Containing Binder

The composition according to an embodiment may further include a carboxylic acid group-containing polymer (hereinafter, binder resin). The carboxylic acid group-containing polymer refers to a polymer including a repeating unit including a carboxylic acid group. The carboxylic acid group-containing polymer may further include a repeating unit having a hydroxy group. The hydroxy group may form a hydrogen bond with a substrate (a glass or a film) and thus increase adherence of the binder resin to the substrate and also, may provide a hydrophilic layer on the binder resin and thus may improve a wettability of the binder resin with a developing solution (e.g., an alkali aqueous solution) during the development process. In addition, the carboxylic acid group may share a hydrogen bond with the substrate like the hydroxy group and thus may increase adherence of the binder resin to the substrate and also, may share an acid-base reaction with the developing solution (e.g., the alkali aqueous solution) and may generate salt, and since this salt may be dissolved in water, the carboxylic acid group may be a key functional group ultimately providing developability. The binder resin may aid in development of the produced pattern with an alkali developing solution.

When such a binder resin is used with a photo-conversion material such as a quantum dot, dispersibility of the quantum dot may be deteriorated or luminous efficiency (e.g., quantum efficiency and/or quantum yield) of the quantum dot may be deteriorated due to a compatibility problem between the two functional groups (hydroxy group and carboxyl group) and the photo-conversion material. In a thermal process (e.g., prebaking and post-baking) for manufacturing a color filter, the hydroxy group and the carboxylic acid group may cause quenching of the photo-conversion material (e.g., quantum dot).

In the case of the composition according to an embodiment, such a quenching phenomenon may be prevented/suppressed even though such a binder is included. Without being bound by any particular theory, in the composition according to an embodiment, a sulfide group (derived from a thiol group) of the metal-containing compound and a metal atom between the sulfide groups (*—S-M-S—* moiety)

may have a strong affinity for a surface of the quantum dot and may stabilize the quantum dot as a ligand to suppress/prevent a quenching phenomenon.

The binder may include a copolymer of a first monomer including a carboxylic acid group and a carbon-carbon double bond, a second monomer including a carbon-carbon double bond and a hydrophobic moiety but not a carboxylic acid group, and optionally, a third monomer having a carbon-carbon double bond and a hydrophilic moiety but not a carboxylic acid group; a multiple aromatic ring-containing polymer having a frame structure in which two aromatic rings in a main chain are bonded with a quaternary carbon atom including another cyclic moiety and including a carboxylic acid group; or a combination thereof.

Specific examples of the first monomer may include acrylic acid, methacrylic acid, crotonic acid, maleic acid, itaconic acid, fumaric acid, 3-butenoic acid, and carbonic acid vinyl ester compounds such as vinyl acetate and vinyl benzoate, but are not limited thereto. The first monomer may include one or more compounds.

Specific examples of the second monomer may be alkenyl aromatic compounds such as styrene, α-methyl styrene, vinyl toluene, or vinyl benzyl methyl ether; unsaturated carbonic acid ester compounds such as methyl acrylate, methyl methacrylate, ethyl acrylate, ethyl methacrylate, butyl acrylate, butyl methacrylate, benzyl acrylate, benzyl methacrylate, cyclohexyl acrylate, cyclohexyl methacrylate, phenyl acrylate, or phenyl methacrylate; unsaturated carbonic acid amino alkyl ester compounds such as 2-amino ethyl acrylate, 2-amino ethyl methacrylate, 2-dimethyl amino ethyl acrylate, or 2-dimethyl amino ethyl methacrylate; maleimides such as N-phenylmaleimide, N-benzylmaleimide, or N-alkylmaleimide; unsaturated carbonic acid glycidyl ester compounds such as glycidyl acrylate or glycidyl methacrylate; vinyl cyanide compounds such as acrylonitrile or methacrylonitrile; and unsaturated amide compounds such as acrylamide or methacrylamide, but are not limited thereto. The second monomer may include one or more compounds.

Specific examples of the third monomer may include 2-hydroxy ethyl acrylate, 2-hydroxy ethyl methacrylate, 2-hydroxy butyl acrylate, and 2-hydroxy butyl methacrylate but are not limited thereto. The third monomer may include one or more compounds.

The carboxylic acid group-containing binder may include a copolymer of (meth)acrylic acid and one or more monomers including alkyl (or aryl or arylalkyl) (meth)acrylate, hydroxyalkyl (meth)acrylate, or styrene. For example, the carboxylic acid group-containing binder may be a methacrylic acid/methyl methacrylate copolymer, a methacrylic acid/benzyl methacrylate copolymer, a methacrylic acid/benzyl methacrylate/styrene copolymer, a methacrylic acid/benzyl methacrylate/2-hydroxy ethyl methacrylate copolymer, or a methacrylic acid/benzyl methacrylate/styrene/2-hydroxy ethyl methacrylate copolymer.

In the multiple aromatic ring-containing polymer, the backbone structure may include a repeating unit represented by Chemical Formula B:

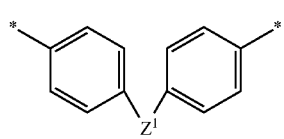

Chemical Formula B wherein, * is a linking position with an adjacent atom of the main chain of the binder, $Z^1$ is a linking moiety represented by one of Chemical Formulae B-1 to B-6, and in Chemical Formulae B-1 to B-6, * is a linking position with an aromatic moiety:

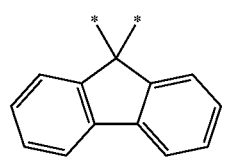

Chemical Formula B-1

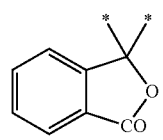

Chemical Formula B-2

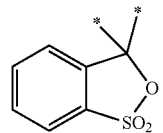

Chemical Formula B-3

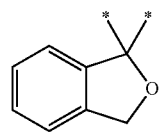

Chemical Formula B-4

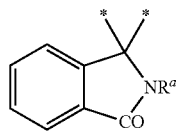

Chemical Formula B-5 wherein, $R^a$ is hydrogen, an ethyl group, $C_2H_4Cl$, $C_2H_4OH$, $CH_2CH=CH_2$, or a phenyl group,

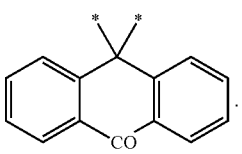

Chemical Formula B-6

The carboxylic acid group-containing binder may have a molecular weight of greater than or equal to about 1,000 g/mol, for example, greater than or equal to about 2,000 g/mol, greater than or equal to about 3,000 g/mol, or greater than or equal to about 5,000 g/mol. The carboxylic acid group-containing binder may have a molecular weight of less than or equal to about 100,000 g/mol, for example, less than or equal to about 50,000 g/mol. Within these ranges, developability may be ensured.

The carboxylic acid group-containing binder may have an acid value of greater than or equal to about 50 milligrams of potassium hydroxide per gram of sample (mg KOH/g). For example, the carboxylic acid group-containing binder may have an acid value of greater than or equal to about 60 mg KOH/g, greater than or equal to about 70 mg KOH/g, 80 mg KOH/g, 90 mg KOH/g, 100 mg KOH/g, or 110 mg KOH/g, greater than or equal to about 120 mg KOH/g, greater than or equal to about 125 mg KOH/g, or greater than or equal to about 130 mg KOH/g. The acid value of the polymer (binder) may be, for example, less than or equal to about 250 mg KOH/g, for example, less than or equal to about 240 mg KOH/g, less than or equal to about 230 mg KOH/g, less than or equal to about 220 mg KOH/g, less than or equal to about 210 mg KOH/g, less than or equal to about 200 mg KOH/g, less than or equal to about 190 mg KOH/g, less than or equal to about 180 mg KOH/g, or less than or equal to about 160 mg KOH/g, but is not limited thereto.

The carboxylic acid group-containing binder may be included in an amount of greater than or equal to about 1 wt %, greater than or equal to about 3 wt %, greater than or equal to about 5 wt %, greater than or equal to about 7 wt %, greater than or equal to about 9 wt %, or greater than or equal to about 10 wt % based on a total amount of the photosensitive resin composition according to an embodiment. The carboxylic acid group-containing binder may be included in an amount of less than or equal to about 50 wt %, less than or equal to about 47 wt %, less than or equal to about 45 wt %, less than or equal to about 40 wt %, less than or equal to about 37 wt %, less than or equal to about 35 wt %, less than or equal to about 30 wt %, less than or equal to about 25 wt %, less than or equal to about 20 wt %, less than or equal to about 19 wt %, less than or equal to about 17 wt %, or less than or equal to about 15 wt % based on a total amount of the photosensitive resin composition according to an embodiment.

(C) Photopolymerizable Monomer

The photosensitive resin composition according to an embodiment includes a photopolymerizable monomer. The photopolymerizable monomer may include a multi-functional monomer having two or more hydroxyl groups.

The photopolymerizable monomer having two or more hydroxyl groups may cause sufficient polymerization during exposure in a pattern-forming process and form a pattern having excellent heat resistance, light resistance, and chemical resistance.

Specific examples of the photopolymerizable monomer may be glycerol acrylate, dipentaerythritol hexaacrylate, ethylene glycol diacrylate, triethylene glycol diacrylate, 1,4-butanediol diacrylate, 1,6-hexanediol diacrylate, neopentylglycol diacrylate, pentaerythritol diacrylate, pentaerythritol triacrylate, pentaerythritol diacrylate, dipentaerythritol triacrylate, dipentaerythritol acrylate, pentaerythritol hexaacrylate, bisphenol A diacrylate, trimethylol propane triacrylate, novolac epoxy acrylate, ethylene glycol dimethacrylate, diethylene glycol dimethacrylate, triethylene glycol dimethacrylate, propylene glycol dimethacrylate, 1,4-butanediol dimethacrylate, 1,6-hexanediol dimethacrylate, and the like, but are not limited thereto.

Commercially available examples of the photopolymerizable monomer are for example Aronix M-101®, M-111®, M-114® (Toagosei Chemistry Industry Co., Ltd.); KAYARAD TC-110S®, TC-120S® (Nippon Kayaku Co., Ltd.); V-158®, V-2311® (Osaka Organic Chemical Ind., Ltd.), and the like; Aronix M-210®, M-240®, M-6200® (Toagosei Chemistry Industry Co., Ltd.), KAYARAD HDDA®, HX-220®, R-604® (Nippon Kayaku Co., Ltd.), V-260®, V-312®, V-335 HP® (Osaka Organic Chemical Ind., Ltd.), and the like; Aronix M-309®, M-400®, M-405®, M-450®, M-7100®, M-8030®, M-8060® (Toagosei Chemistry Industry Co., Ltd.), KAYARAD TMPTA®, DPCA-20®, DPCA-30®, DPCA-60®, DPCA-120® (Nippon Kayaku Co., Ltd.), V-295®, V-300®, V-360®, V-GPT®, V-3PA®, V-400® (Osaka Yuki Kayaku Kogyo Co. Ltd.), and the like. These may be used alone or as a mixture of two or more, but is not limited thereto.

The photopolymerizable monomer may be treated with acid anhydride to improve developability.

The photopolymerizable monomer may be included in an amount of greater than or equal to about 1 wt %, greater than or equal to about 2 wt %, greater than or equal to about 3 wt %, greater than or equal to about 4 wt %, greater than or equal to about 5 wt %, or greater than or equal to about 6 wt % based on a total amount of the photosensitive resin composition according to an embodiment. The photopolymerizable monomer may be included in an amount of less than or equal to about 50 wt %, less than or equal to about 47 wt %, less than or equal to about 45 wt %, less than or equal to about 40 wt %, less than or equal to about 37 wt %, less than or equal to about 35 wt %, less than or equal to about 30 wt %, less than or equal to about 25 wt %, less than or equal to about 20 wt %, less than or equal to about 19 wt %, less than or equal to about 17 wt %, or less than or equal to about 15 wt % based on a total amount of the photosensitive resin composition according to an embodiment.

The photopolymerizable monomer may be included in an amount of about 0.1 wt % to about 50 wt %, for example about 1 wt % to about 30 wt %, or about 1 wt % to about 20 wt % based on a total amount of the photosensitive resin composition. When the photopolymerizable monomer is included within this range, excellent pattern-forming capability and excellent durability (heat resistance, light resistance, and chemical resistance, etc.) may be obtained. In an embodiment, three or more multi-functional monomers may be effectively applied.

(D) Photopolymerization Initiator

The photopolymerization initiator may be a generally-used initiator for a photosensitive resin composition, and may be, for example an acetophenone compound (i.e., a compound containing an acetophenone), a benzophenone compound, a thioxanthone compound, a benzoin compound, a triazine compound, an oxime compound, and the like.

Examples of the acetophenone compound may be 2,2'-diethoxy acetophenone, 2,2'-dibutoxy acetophenone, 2-hydroxy-2-methylpropiophenone, p-t-butyltrichloro acetophenone, p-t-butyldichloro acetophenone, 4-chloro acetophenone, 2,2'-dichloro-4-phenoxy acetophenone, 2-methyl-1-(4-(methylthio)phenyl)-2-morpholinopropan-1-one, or 2-benzyl-2-dimethylamino-1-(4-morpholinophenyl)-butan-1-one.

Examples of the benzophenone compound may be benzophenone, benzoyl benzoate, benzoyl methyl benzoate, 4-phenyl benzophenone, hydroxybenzophenone, acrylated benzophenone, 4,4'-bis(dimethyl amino)benzophenone, 4,4'-bis(diethylamino)benzophenone, 4,4'-dimethylaminobenzophenone, 4,4'-dichlorobenzophenone, or 3,3'-dimethyl-2-methoxybenzophenone.

Examples of the thioxanthone compound may be thioxanthone, 2-methylthioxanthone, isopropyl thioxanthone, 2,4-diethyl thioxanthone, 2,4-diisopropyl thioxanthone, or 2-chlorothioxanthone.

Examples of the benzoin compound may be benzoin, benzoin methyl ether, benzoin ethyl ether, benzoin isopropyl ether, benzoin isobutyl ether, or benzyldimethylketal.

Examples of the triazine compound may be 2,4,6-trichloro-s-triazine, 2-phenyl-4,6-bis(trichloromethyl)-s-triazine, 2-(3',4'-dimethoxystyryl)-4,6-bis(trichloromethyl)-s-triazine, 2-(4'-methoxynaphthyl)-4,6-bis(trichloromethyl)-s-triazine, 2-(p-methoxyphenyl)-4,6-bis(trichloromethyl)-s-triazine, 2-(p-tolyl)-4,6-bis(trichloro methyl)-s-triazine, 2-biphenyl-4,6-bis(trichloro methyl)-s-triazine, bis(trichloromethyl)-6-styryl-s-triazine, 2-(naphthol-yl)-4,6-bis(trichloromethyl)-s-triazine, 2-(4-methoxynaphtho1-yl)-4,6-bis(trichloromethyl)-s-triazine, 2-4-bis(trichloromethyl)-6-piperonyl-s-triazine, or 2-4-bis(trichloromethyl)-6-(4-methoxystyryl)-s-triazine.

Examples of the oxime compound may be 1,2-octandione, O-acyloxime compound, 2-(O-benzoyloxime)-1-[4-(phenylthio)phenyl]-1,2-octandione, 1-(O-acetyloxime)-1-[9-ethyl-6-(2-methylbenzoyl)-9H-carbazol-3-yl]ethanone, or O-ethoxycarbonyl-α-oxyamino-1-phenylpropan-1-one. Specific examples of the O-acyloxime compound may be 2-dimethylamino-2-(4-methylbenzyl)-1-(4-morpholin-4-yl-phenyl)-butan-1-one, 1-(4-phenylsulfanyl phenyl)-butane-1,2-dione-2-oxime-O-benzoate, 1-(4-phenylsulfanyl phenyl)-octane-1,2-dione-2-oxime-O-benzoate, 1-(4-phenylsulfanyl phenyl)-octan-1-one-oxime-O-acetate, or 1-(4-phenylsulfanyl phenyl)-butan-1-one-oxime-O-acetate.

The photopolymerization initiator may further include a carbazole compound, a diketone compound, a sulfonium borate compound, a diazo compound, an imidazole compound, a biimidazole compound, and the like.

The photopolymerization initiator may be used with a photosensitizer capable of causing a chemical reaction by absorbing light and becoming excited and then, transferring its energy.

Examples of the photosensitizer may be tetraethylene glycol bis-3-mercapto propionate, pentaerythritol tetrakis-3-mercapto propionate, dipentaerythritol tetrakis-3-mercapto propionate, and the like.

The photopolymerization initiator may be included in an amount of about 0.1 wt % to about 10 wt %, for example about 0.2 wt % to about 5 wt % based on a total amount of the photosensitive resin composition. When the photopolymerization initiator is included within this range, a balance between sensitivity and developability during exposure may be improved and a pattern having improved resolution without a residual film may be obtained.

(E) Solvent

A photosensitive resin composition according to an embodiment includes a photo-conversion material such as a quantum dot instead of a pigment or a dye as a color material, and thus may include a solvent having compatibility with the photo-conversion material. Therefore, a photosensitive organic layer manufactured by curing the photosensitive resin composition according to an embodiment may have a significantly improved photo-conversion rate.

Examples of the solvent having compatibility with the photo-conversion material may be, for example, alkanes (R—H) such as pentane, hexane, heptanes, and the like; aromatic hydrocarbons (Ar—H) such as toluene, xylene, and the like; ethers (R—O—R) such as diisoamyl ether, dibutyl ether, and the like; alkyl halides (R—X) such as chloroform, trichloromethane, and the like; cycloalkanes such as cyclopropane, cyclobutane, cyclopentane, cyclohexane, and the like; and other solvents known in the art, but is not limited thereto.

A photosensitive resin composition according to an embodiment may further include a solvent having compatibility with the binder resin and the photopolymerization initiator as well as a solvent having compatibility with the photo-conversion material as a solvent. The binder resin, photopolymerization initiator, and the like may have compatibility with the solvent having compatibility with the photo-conversion material to a degree, but the photo-conversion material may have almost no compatibility with the solvent having compatibility with the binder resin and the photopolymerization initiator. Accordingly, the photosensitive resin composition according to an embodiment may include only solvent having compatibility with the photo-conversion material or a mixture of the solvent having compatibility with the photo-conversion material and the solvent having compatibility with the binder resin and the photopolymerization initiator.

Examples of the solvent having compatibility with the binder resin and the photopolymerization initiator may be, for example, alcohols such as methanol, ethanol, and the like; glycol ethers such as ethylene glycol methylether, ethylene glycol ethylether, propylene glycol methylether, and the like; cellosolve acetates such as methyl cellosolve acetate, ethyl cellosolve acetate, diethyl cellosolve acetate, and the like; carbitols such as methylethyl carbitol, diethyl carbitol, diethylene glycol monomethylether, diethylene glycol monoethylether, diethylene glycol dimethylether, diethylene glycol methylethylether, diethylene glycol diethylether, and the like; propylene glycol alkylether acetates such as propylene glycol monomethylether acetate, propylene glycol propylether acetate, and the like; ketones such as methylethylketone, cyclohexanone, 4-hydroxy-4-methyl-2-pentanone, methyl-n-propylketone, methyl-n-butylketone, methyl-n-amylketone, 2-heptanone, and the like; saturated aliphatic monocarboxylic acid alkyl esters such as ethyl acetate, n-butyl acetate, isobutyl acetate, and the like; lactic acid alkyl esters such as methyl lactate, ethyl lactate, and the like; hydroxyacetic acid alkyl esters such as methyl hydroxyacetate, ethyl hydroxyacetate, butyl hydroxyacetate, and the like; acetic acid alkoxyalkyl esters such as methoxymethyl acetate, methoxyethyl acetate, methoxybutyl acetate, ethoxymethyl acetate, ethoxyethyl acetate, and the like; 3-hydroxypropionic acid alkyl esters such as methyl 3-hydroxypropionate, ethyl 3-hydroxypropionate, and the like; 3-alkoxypropionic acid alkyl esters such as methyl 3-methoxypropionate, ethyl 3-methoxypropionate, ethyl 3-ethoxypropionate, methyl 3-ethoxypropionate, and the like; 2-hydroxypropionic acid alkyl esters such as methyl 2-hydroxypropionate, ethyl 2-hydroxypropionate, propyl 2-hydroxypropionate, and the like; 2-alkoxypropionic acid alkyl esters such as methyl 2-methoxypropionate, ethyl 2-methoxypropionate, ethyl 2-ethoxypropionate, methyl 2-ethoxypropionate, and the like; 2-hydroxy-2-methylpropionic acid alkyl esters such as methyl 2-hydroxy-2-methylpropionate, ethyl 2-hydroxy-2-methylpropionate, and the like; 2-alkoxy-2-methylpropionic acid alkyl esters such as methyl 2-methoxy-2-methylpropionate, ethyl 2-ethoxy-2-methylpropionate, and the like; esters such as 2-hydroxyethyl propionate, 2-hydroxy-2-methylethyl propionate, hydroxyethyl acetate, methyl 2-hydroxy-3-methylbutanoate, and the like; and ketonate ester compounds such as ethyl pyruvate and the like, and a solvent such as N-methylformamide, N,N-dimethyl formamide, N-methylformanilide, N-methylacetamide, N,N-dimethyl acetamide, N-methylpyrrolidone, dimethylsulfoxide, benzylethylether, dihexylether, acetylacetone, isophorone, caproic acid, caprylic acid, 1-octanol, 1-nonanol, benzyl alcohol, benzyl acetate, ethyl benzoate, diethyl oxalate, diethyl maleate, γ-butyrolactone, ethylene carbonate, propylene carbonate, phenyl cellosolve acetate, and the like may be also used, but is not limited thereto.

For example, considering compatibility and reactivity, examples of the solvent having compatibility with the binder resin and the photopolymerization initiator may be glycol ethers such as ethylene glycol monoethylether, and the like; ethylene glycol alkylether acetates such as ethyl cellosolve acetate, and the like; esters such as 2-hydroxy ethyl propionate, and the like; carbitols such as diethylene glycol monomethylether, and the like; propylene glycol alkylether acetates such as propylene glycol monomethylether acetate, propylene glycol propylether acetate, and the like may be preferably used.

The solvent may be used in a balance amount, for example about 30 wt % to about 80 wt %, for example about 35 wt % to about 80 wt % based on a total amount of the photosensitive resin composition. When the solvent is within this range, the photosensitive resin composition may have appropriate, e.g., desirable, viscosity and thus may have excellent coating property when coated in a large area through, for example, spin-coating or slit-coating.

(F) Scatterer

A photosensitive resin composition according to an embodiment may further include a scatterer.

For example, the scatterer may include titanium dioxide ($TiO_2$), barium sulfate ($BaSO_4$), calcium carbonate ($CaCO_3$), zirconia ($ZrO_2$), or a combination thereof.

The scatterer reflects light not absorbed in the above photo-conversion material, so that the reflected light may be adsorbed again in the photo-conversion material. In other words, the scatterer may increase a dose of the light absorbed in the photo-conversion material and thus photo-conversion efficiency of the photosensitive resin composition.

The scatterer may have an average particle diameter (e.g., $D_{50}$) of about 150 nm to about 500 nm, for example, about 160 nm to about 250 nm, and specifically about 180 nm to about 230 nm. When the scatterer has an average particle diameter within this range, excellent light scattering effects may be obtained, and photoconversion efficiency may be increased.

The scatterer may be included in an amount of about 0.1 wt % to about 20 wt %, for example about 1 wt % to about 15 wt % based on a total weight of the photosensitive resin composition. When the scatterer is included in an amount of less than 0.1 wt % based on a total weight of the photosensitive resin composition, the scattering effect of improving photoconversion efficiency may be difficult to obtain, while when the scatterer is included in an amount of greater than 20 wt %, pattern characteristics of a photosensitive organic layer may be deteriorated.

(G) Monomolecular Compound Including Thiol Group at the Terminal End

In order to improve stability and dispersibility of the quantum dot, a photosensitive resin composition according to an embodiment may further include a monomolecular compound including a thiol group at the terminal end.

The monomolecular compound including a thiol group at the terminal end may replace the shell surface of the quantum dot, and may improve dispersion stability of a quantum dot in a solvent and may stabilize the quantum dot.

The thiol additive may have one or more, for example, 2 to 10, for example 2 to four thiol groups (—SH) at the terminal end according to its structure.

For example, the monomolecular compound including a thiol group at the terminal end may include at least two functional groups represented by Chemical Formula 4.

Chemical Formula 4

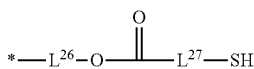

In Chemical Formula 4, $L^{26}$ and $L^{27}$ are the same or different, and are independently a single bond, a substituted or unsubstituted C1 to C20 alkylene group, a substituted or unsubstituted C3 to C20 cycloalkylene group, a substituted or unsubstituted C6 to C20 arylene group, or a substituted or unsubstituted C2 to C20 heteroarylene group.

For example, the monomolecular compound including a thiol group at the terminal end may be represented by Chemical Formula 5.

Chemical Formula 5

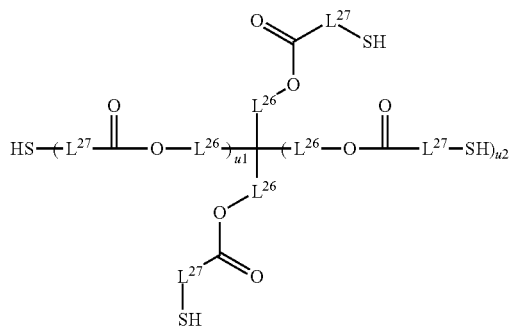

In Chemical Formula 5, $L^{26}$ and $L^{27}$ are the same or different, and are independently a single bond, a substituted or unsubstituted C1 to C20 alkylene group, a substituted or unsubstituted C3 to C20 cycloalkylene group, a substituted or unsubstituted C6 to C20 arylene group, or a substituted or unsubstituted C2 to C20 heteroarylene group, and u1 and u2 are the same or different, and are independently an integer of 0 or 1.

For example, in Chemical Formula 4 and Chemical Formula 5, the $L^{26}$ and $L^{27}$ may be the same or different, and may independently be a single bond or a substituted or unsubstituted C1 to C20 alkylene group.

Specific examples of the monomolecular compound including a thiol group at the terminal end include pentaerythritol tetrakis(3-mercaptopropionate) represented by Chemical Formula 5a, trimethylolpropane tris(3-mercaptopropionate) represented by Chemical Formula 5b, pentaerythritol tetrakis(mercaptoacetate) represented by Chemical Formula 5c, trimethylolpropane tris(2-mercaptoacetate) represented by Chemical Formula 5d, ethylene glycol di-3-mercaptopropionate represented by Chemical Formula 5e, and a combination thereof.

Chemical Formula 5a

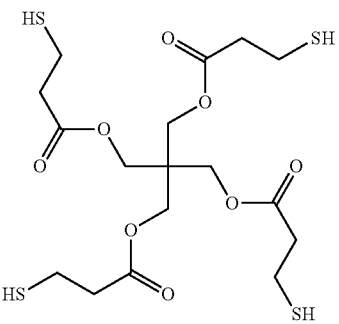

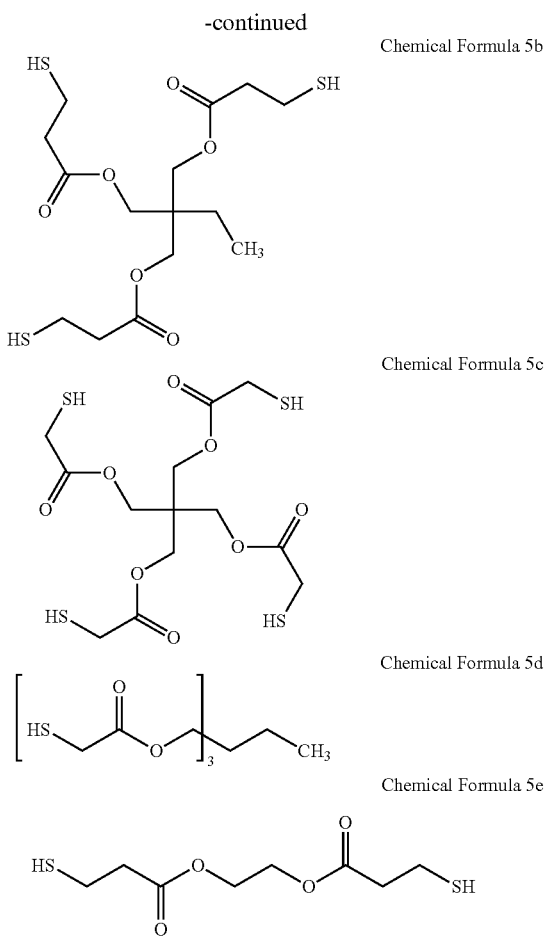

Chemical Formula 5b

Chemical Formula 5c

Chemical Formula 5d

Chemical Formula 5e

The monomolecular compound including a thiol group at the terminal end may be included in an amount of about 0.1 wt % to about 10 wt %, for example about 0.1 wt % to about 5 wt % based on a total amount of photosensitive resin composition. When the monomolecular compound including a thiol group at the terminal end is included within these ranges, stability of a photo-conversion material such as a quantum dot may be improved, the thiol group in the component may react with an acrylic group of a resin or a monomer to form a covalent bond and thereby heat resistance of a photo-conversion material such as a quantum dot may be improved.

(H) Other Additives

A photosensitive resin composition according to an embodiment may include malonic acid; 3-amino-1,2-propanediol; a silane coupling agent; a leveling agent; fluorine surfactant; or a combination thereof in order to improve heat resistance and reliability.

For example, the photosensitive resin composition may further include a silane coupling agent having a reactive substituent such as a vinyl group, a carboxyl group, a methacryloxy group, an isocyanate group, an epoxy group and the like in order to improve close contacting properties with a substrate.

Examples of the silane coupling agent may be trimethoxysilyl benzoic acid, γ-methacryloxypropyl trimethoxysilane, vinyl triacetoxysilane, vinyl trimethoxysilane, γ-isocyanate propyl triethoxysilane, γ-glycidoxy propyl trimethoxysilane, β-(3,4-epoxycyclohexyl)ethyltrimethoxysilane, and the like. These may be used alone or in a mixture of two or more.

The silane coupling agent may be used in an amount of about 0.01 parts by weight to about 10 parts by weight based on 100 parts by weight of the photosensitive resin composition. When the silane coupling agent is included within this range, close contacting properties, storage capability, and the like may be improved.

The photosensitive resin composition may further include a surfactant, for example a fluorine surfactant in order to improve coating properties and inhibit generation of spots, that is, improve leveling performance.

The fluorine surfactant may have a surface tension of about 18 millinewtons per meter (mN/m) to about 23 mN/m (measured in a 0.1% polyethylene glycol monomethylether acetate (PGMEA) solution). When the fluorine surfactant has a surface tension within this range, leveling performance may be further improved, and excellent characteristics may be provided when slit coating as high speed coating is applied since less film defects may be generated by preventing a spot generation during the high speed coating and suppressing a vapor generation.

Examples of the fluorine surfactant may be those commercially available as BM-1000®, and BM-1100® (BM Chemie Inc.); MEGAFACE F 142D®, F 172®, F 173®, and F 183® (Dainippon Ink Kagaku Kogyo Co., Ltd.); FULORAD FC-135®, FULORAD FC-170C®, FULORAD FC-430®, and FULORAD FC-431® (Sumitomo 3M Co., Ltd.); SURFLON S-112®, SURFLON S-113®, SURFLON S-131®, SURFLON S-141®, and SURFLON S-145® (ASAHI Glass Co., Ltd.); SH-28PA®, SH-190®, SH-193®, SZ-6032®, and SF-8428®, and the like (Toray Silicone Co., Ltd.); and F-482, F-484, F-478, F-554, and the like (DIC Co., Ltd.)

The surfactant may further include a silicone surfactant in addition to the fluorine surfactant. Specific examples of the silicone surfactant may be those commercially available as TSF400, TSF401, TSF410, TSF4440, and the like (Toshiba Silicone Co., Ltd.), but is not limited thereto.

The surfactant may be included in an amount of about 0.01 parts by weight to about 5 parts by weight, for example about 0.1 parts by weight to about 2 parts by weight based on 100 parts by weight of the photosensitive resin composition. When the surfactant is included within these ranges, less foreign materials may be produced, e.g., present, after the development.

In addition, the photosensitive resin composition according to an embodiment may further include other additives such as an antioxidant, a stabilizer, and the like in a predetermined amount, unless properties are deteriorated.

The photosensitive resin composition may have a viscosity increase of less than or equal to about 10% relative to an initial viscosity after standing at 10° C. to 30° C. for 140 hours to 150 hours.

An embodiment provides a photosensitive resin film (a quantum dot (QD) sheet complex) manufactured using the photosensitive resin composition.

A method of forming patterns of the photosensitive resin film is as follows.

(1) Coating and Film Formation

The photosensitive resin composition is coated to have a desired thickness, for example, a thickness ranging from 2 micrometers (μm) to 10 μm, on a substrate which undergoes a predetermined pretreatment, using a spin or slit coating method, a roll coating method, a screen-printing method, an applicator method, or the like. Then, the coated substrate is heated at a temperature ranging from about 70° C. to about 90° C. for about 1 minute to about 10 minutes to remove a solvent.

(2) Exposure

The resultant film is radiated by an active ray such as UV ray of about 190 nm to about 450 nm, for example about 200 nm to about 500 nm after applying a mask with a predetermined shape to form a desired pattern. The radiation is performed by using a light source such as a mercury lamp with a low pressure, a high pressure, or an ultrahigh pressure, a metal halide lamp, an argon gas laser, or the like. An X ray, an electron beam, or the like may be also used.

The exposure process uses, for example, a light dose of about 500 millijoule per square centimeter ($mJ/cm^2$) or less (with a 365 nm sensor) when a high pressure mercury lamp is used. However, the light dose may vary depending on each component of the black photosensitive resin composition, the combination ratio of the components of the black photosensitive resin composition, and a dry film thickness.

(3) Development

After the exposure process, an alkali aqueous solution is used to develop the exposed film by dissolving and removing an unnecessary part except the exposed part, forming an image pattern. In other words, when the alkali developing solution is used for the development, a non-exposed region is dissolved, and an image color filter pattern is formed.

(4) Post-Treatment

The developed image pattern may be heated again or radiated by an active ray or the like for curing, in order to accomplish excellent quality in terms of heat resistance, photo resistance, close contacting properties, crack-resistance, chemical resistance, high strength, storage stability, or the like.

A plurality of photosensitive resin compositions including a quantum dot (e.g., red light emitting quantum dot, green quantum dot, or optionally a blue quantum dot) having desirable photoluminescence properties (photoluminescence peak wavelength etc.) are prepared and patterning process is repeated a necessary number of times (e.g., at least twice or three times) using each photosensitive resin composition to obtain a desirable pattern. For example, a photosensitive resin film manufactured using the photosensitive resin composition may have a repetitive pattern of two or more color sections (e.g., red-green-blue (RGB) color sections).

That is, the QD sheet complex is obtained by curing the photosensitive resin composition according to an embodiment, and thus the QD sheet includes polymer matrix in which the photo-conversion material is dispersed, and the polymer matrix includes *—S-M-S—* (wherein M is Zn, Al, Mg, Ca, Sc, Ti, V, Cr, Mn, Fe, Co, Ni, Cu, Ga, Sr, Y, Zr, Nb, Mo, Cd, In, Ba, Au, Hg, or Tl) structure and an ester linking group. For example, the photo-conversion material may be passivated by the *—S-M-S—* (wherein M is Zn, Al, Mg, Ca, Sc, Ti, V, Cr, Mn, Fe, Co, Ni, Cu, Zn, Ga, Sr, Y, Zr, Nb, Mo, Cd, In, Ba, Au, Hg, or Tl) structure.

In an embodiment, a laminated structure includes a substrate and a photo-conversion layer disposed on the substrate, wherein the photo-conversion layer includes at least one repetitive section emitting light in a predetermined wavelength and the repetitive section includes the complex. The repetitive section may include a first section configured to emit first light. The first light may be red light but is not limited thereto. The repetitive section may include a second section configured to emit second light that is different from the first light. The second light may be green light but is not limited thereto. The photo-conversion layer may further include a third section configured to transmit third light. The third light may absorb incident light (e.g., blue light) but is not limited thereto.

In the laminated structure, the substrate may correspond to an upper substrate of a liquid crystal panel, but is not limited thereto. In the laminated structure, the first section and the second section may correspond to a plurality of pixels in a display device that will be described later. The first section and the second section may include the complex in order to convert incident light to light in a different wavelength and may correspond to for example, a red pixel and a green pixel. The third section may correspond to a blue pixel configured to transmit incident light.

Another embodiment provides an electronic device including the laminated structure.

The electronic device may be a light emitting diode (LED), an organic light emitting diode (OLED), a sensor such as an image sensor, a solar cell, or a display device such as a liquid crystal display (LCD) device, but is not limited thereto.

An embodiment provides a display device (e.g., a liquid crystal display (LCD) device) including the laminated structure and a light source configured to supply the laminated structure with incident light.

The pattern may replace an absorption-type color filter in an electronic device such as a display device and thus may be desirably used as a photoluminescent color filter. The display device may be a liquid crystal display device and a display device wherein the light source is an organic light emitting diode (OLED).

In a non-limiting embodiment, a liquid crystal display device is described referring to FIG. 1. The liquid crystal display device includes a backlight unit including a light source and a liquid crystal panel 200 disposed on the backlight unit. The liquid crystal panel 200 may include a lower substrate 210, an upper substrate 240 opposed to the lower substrate, and a liquid crystal layer 220 between the upper and lower substrates, wherein a photo-conversion layer manufactured from the composition according to an embodiment is included as a photoluminescent color filter layer on one surface (e.g., upper surface or lower surface) of the upper substrate. At least one of the first section and the second section of the photo-conversion layer may include the complex. For example, a patterned photo-conversion layer including the complex and a black matrix may be disposed on one surface (e.g., upper surface or lower surface) of the upper substrate. An optical element 300 may be disposed under the liquid crystal panel 200 (e.g., under the lower substrate). An optical element 300 may be disposed inside the liquid crystal panel 200 (e.g., under the photoluminescent color filter layer). The optical element 300 may be a polarizer or a polarizing plate.

The backlight unit includes a light source 110. The light source may emit blue light or white light. The light source may include a blue LED, a white LED, a white OLED, or a combination thereof, but is not limited thereto.

The backlight unit may further include a light guide 120. In an embodiment, the backlight unit may be an edge-type lighting. For example, the backlight unit may include a reflector (not shown), a light guide (not shown) provided on the reflector and providing a planar light source with the liquid crystal panel 200, and/or at least one optical sheet (not shown) on the light guide, for example, a diffusion plate, a prism sheet, or the like, but is not limited thereto. The backlight unit may not include a light guide. In an embodiment, the backlight unit may provide direct lighting. For example, the backlight unit may have a reflector (not shown), and may have a plurality of fluorescent lamps disposed on the reflector at regular intervals, or may have an LED operating substrate on which a plurality of light emitting diodes may be disposed, a diffusion plate thereon, and optionally at least one optical sheet. Details (e.g., each component of a light emitting diode, a fluorescent lamp, light guide, various optical sheets, and a reflector) of such a backlight unit are known and are not particularly limited.

The lower substrate 210 that is also referred to as an array substrate may be a transparent insulation material substrate (e.g., a glass substrate, a polymer substrate including a polyester such as polyethylene terephthalate (PET) or polyethylene naphthalate (PEN), polycarbonate, and/or a poly ((C1-C12 alkyl) meth)acrylate), or an inorganic material substrate such as a polysiloxane, $Al_2O_3$, or ZnO).

A wire plate 211 is disposed on the lower substrate 210. The wire plate 211 may include may include a plurality of gate wires (not shown) and data wires (not shown) that define a pixel area, a thin film transistor disposed adjacent to a crossing region of gate wires and data wires, and a pixel electrode for each pixel area, but is not limited thereto. Details of such a wire plate are known and are not particularly limited.

The liquid crystal layer 220 may be disposed on the wire plate 211. The liquid crystal layer 220 may include an alignment layer 221 on and under the layer 220 to initially align the liquid crystal material included therein. Details (e.g., a liquid crystal material, an alignment layer material, a method of forming liquid crystal layer, a thickness of liquid crystal layer, or the like) of the liquid crystal material and the alignment layer are known and are not particularly limited.

A lower polarizer 300 is provided under the lower substrate. Materials and structures of the polarizer 300 are known and are not particularly limited. A backlight unit (e.g., emitting blue light) may be disposed under the polarizer 300. An upper optical element or an upper polarizer 300 may be provided between the liquid crystal layer 220 and the upper substrate 240, but is not limited thereto. The upper polarizer may be disposed on the upper substrate 240. The polarizer may be any polarizer that used in a liquid crystal display device. The polarizer may be TAC (triacetyl cellulose) having a thickness of less than or equal to about 200 µm, but is not limited thereto. In an embodiment, the upper optical element may be a coating that controls a refractive index without a polarization function.

A black matrix 241 is provided on one surface (e.g., lower surface or upper surface) of the upper substrate 240 and has an opening and hides a gate line, a data line, and a thin film transistor of a wire plate on the lower substrate. For example, the black matrix 241 may have a lattice shape. The photosensitive resin film is provided as a photoluminescent color filter layer 230 in the opening of the black matrix 241. The photoluminescent color filter layer may include a first section (R) configured to emit first light (e.g., red light), a second section (G) configured to emit second light (e.g., green light), and a third section (B) configured to emit/transmit, for example blue light. The first section may include a red light emitting quantum dot. The second section may include a green light emitting quantum dot. The photoluminescent color filter layer may further include at least one fourth section. The fourth section may include a quantum dot that emits different color from light emitted from the first to third sections (e.g., cyan, magenta, or yellow light).

In the photoluminescent color filter layer 230, sections forming a pattern may be repeated corresponding to pixel areas formed on the lower substrate. A transparent common electrode 231 may be provided on the photoluminescent color filter layer.

The third section (B) configured to emit/transmit blue light may be a transparent color filter that does not change a light emitting spectrum of the light source. In this case, blue light emitted from the backlight unit may enter in a polarized state and may be emitted through the polarizer and the liquid crystal layer as it is. The third section may include a quantum dot emitting blue light.

The display device may further have a blue light blocking layer (blue filter). The blue light blocking layer may be disposed between lower surfaces of the first section (R) and the second section (G) and the upper substrate 300 or on the upper substrate (not shown). The blue light blocking layer may be a sheet having an opening in a region corresponding to a pixel area (a third section) displaying blue and thus formed in a region corresponding first and second sections. In an embodiment, the blue light blocking layer may be formed by alternating at least two layers having different refractive indexes and thus may transmit light in a blue wavelength region but block light in the other wavelength regions. The blocked blue wavelength light may be reflected and recycled. The blue light blocking layer may play a role of blocking blue light emitted from a light source from being directly emitted outside.

Figure 2:
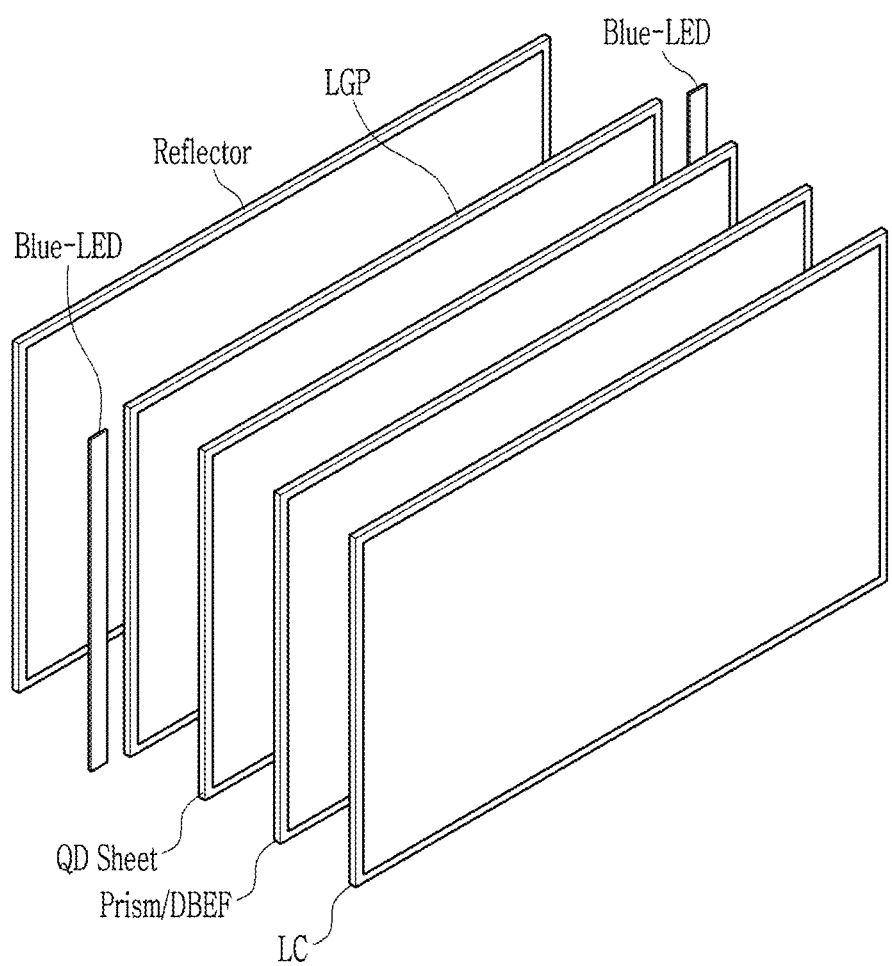
FIG. 2 is an exploded view of an embodiment showing an electronic device.

According to an embodiment, referring to FIG. 2, a liquid crystal display device may have a structure where a reflector, a light guide (LGP), a blue LED light source (blue-LED), the complex (e.g., a film manufactured from the quantum dot-containing photosensitive composition), various optical films (e.g., a prism and a double brightness enhance film (DBEF)) may be laminated and a liquid crystal panel is disposed thereon.

Hereinafter, examples of the present disclosure are described. These examples, however, are not in any sense to be interpreted as limiting the scope of the disclosure.

EXAMPLES

Preparation of Metal-Containing Compound

Synthesis Example 1

A compound represented by Chemical Formula 6 (a weight average molecular weight: 2,400 g/mol) is prepared by putting 1.5 grams (g) of vinyl acetate, 1.5 g of isobornyl acrylate, 1.5 g of 2-ethylhexyl acrylate, 4.5 g of pentaerythritol tetrakis(2-mercaptoacetate) (PE-TSA, JLChem Co., Ltd.), and 2.97 g of zinc chloride ($ZnCl_2$, Aldrich Corp.) in a mixed solvent of 2.25 g of propylene glycol monomethylether acetate (PGMEA) and 18 g of cyclohexyl acetate and stirring the mixture at 60° C. for 12 hours.

Chemical Formula 6

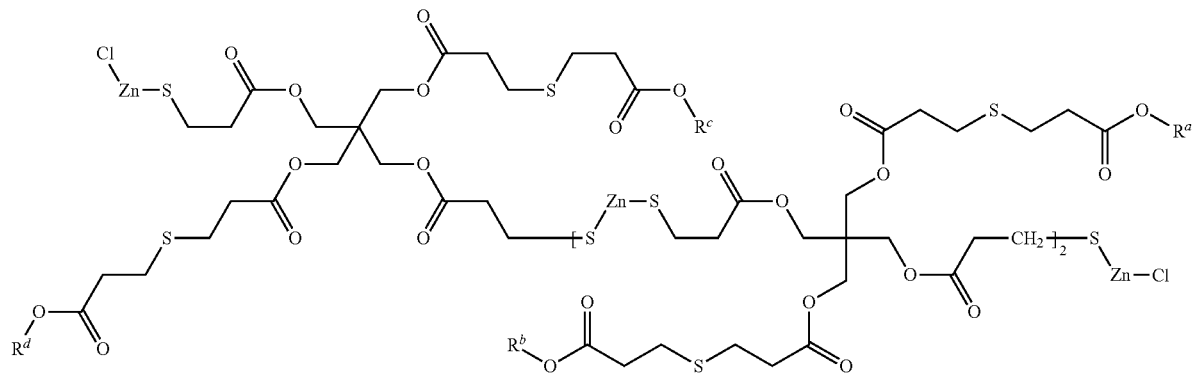

In Chemical Formula 6, $R^a$, $R^b$, $R^c$, and $R^d$ are the same or different, and are independently represented by one of Chemical Formula 6-1 to Chemical Formula 6-3.

Chemical Formula 6-1

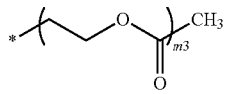

Chemical Formula 6-2

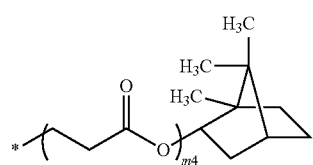

Chemical Formula 6-3

In Chemical Formula 6-1 to Chemical Formula 6-3,
m2 to m4 are the same or different, and are independently an integer of 0 or 1.

Synthesis Example 2

A compound represented by Chemical Formula 7 (a weight average molecular weight: 2,600 g/mol) is prepared by putting 1 g of pentaerythritol tetrakis(2-mercaptoacetate) (PE-TSA, JLChem Co., Ltd.), 0.66 g of zinc chloride ($ZnCl_2$, Aldrich Corp.), and 1.0 g of propylene glycol monomethylether acetate (PGMEA) in 1.3 g of isobornyl acrylate and then, stirring the mixture at 60° C. for 12 hours.

Chemical Formula 7

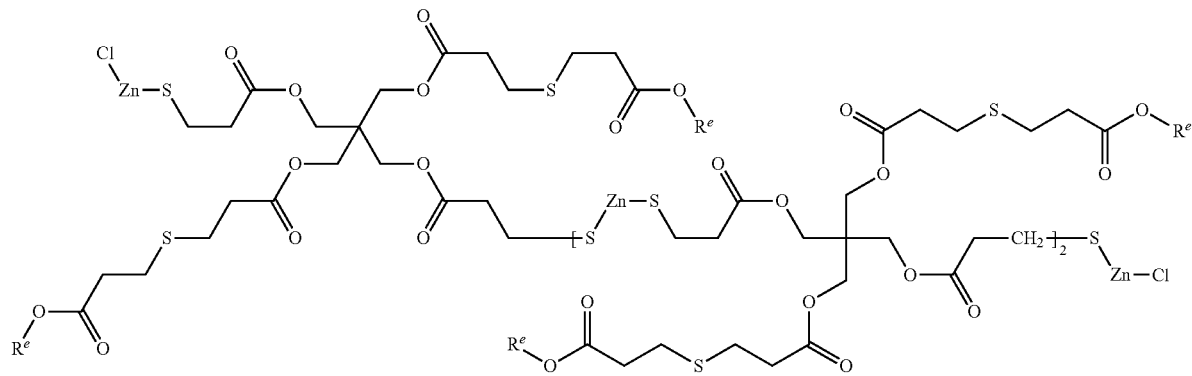

In Chemical Formula 7,
$R^e$ is represented by Chemical Formula 6-2.

Evaluation 1: Measurement of Luminous Efficiency (Quantum Efficiency) of Quantum Dot Reference Example 1

0.5 g of the metal-containing compound according to Synthesis Example 1 or 2 and 1.2 g of one acryl-containing binder resin (SM-400H) are mixed to obtain a mixture. The mixture is mixed with an InP/ZnS quantum dot (0.6 g in 1.2 g of chloroform, Hansol Chemical) to prepare a quantum dot dispersion, and then, QY (a quantum yield) at every time about each quantum dot dispersion is measured, and the results are shown in Table 1.

Reference Example 2

An InP/ZnS quantum dot (0.6 g in 1.2 g of chloroform, Hansol Chemical) is mixed with two kinds of acryl-containing binder resin (SM-400H, NPR1520) each in an amount of 1.7 g to prepare a quantum dot dispersion, and QY (a quantum yield) about each quantum dot dispersion at every time is measured. The results are shown in the following Table 1.

TABLE 1

| Components of quantum dot dispersion | Reference Example 1 | | Reference Example 2 | |
|---|---|---|---|---|
| | Quantum dot + metal-containing compound of Synthesis Example 1 + SM-400H | Quantum dot + metal-containing compound of Synthesis Example 2 + SM-400H | Quantum dot + SM-400H | Quantum dot + NPR1520 |
| QY (8 hours after mixing) | 86% | 87% | 76% | 72% |
| QY (100 hours after mixing) | 85% | 84% | 53% | 30% |

As shown in Table 1, the dispersions obtained by mixing the metal-containing compounds including a structural unit represented by Chemical Formula 1 (Synthesis Examples 1 and 2) and a quantum dot show high luminous efficiency and do not show high luminous efficiency decrease rate depending on time compared with a case of a metal-containing compound including no structural unit represented by Chemical Formula 1.

Preparation of Photosensitive Resin Composition

Each photosensitive resin composition according to Examples 1 to 4 and Comparative Examples 1 and 2 is prepared to have a composition shown in Table 2 by using components mentioned therein.

Specifically, a photopolymerization initiator is dissolved in a solvent, and the solution is sufficiently stirred at room temperature for 2 hours. Subsequently, a metal-containing compound along with a photo-conversion material (a green quantum dot) and a dispersing agent (TEGO D685 made by EVONIK) are added thereto, and the obtained mixture is stirred again at room temperature for 2 hours. Then, a scatterer and a fluorine surfactant are added thereto, a mixture obtained therefrom is stirred at room temperature for one hour, and a product therefrom is three times filtered to remove impurities to prepare a photosensitive resin composition.

A dispersing agent is added in an amount of 15 wt % relative to a solid content of the green quantum dot (A) Photo-conversion Material (Green QD)

InP/ZnS quantum dot (fluorescence wavelength $\lambda em=525$ nm, FWHM=40 nm, Green QD, Hansol Chemical)

(B-1) Metal-containing Compound (B-1-a) Metal-containing compound prepared in Synthesis Example 1

(B-1-b) Metal-containing compound prepared in Synthesis Example 2

(B-2) Carboxylic acid-containing Binder Resin (B-2-a) Acryl binder resin (SM-400H, SMS)

(B-2-b) Acryl-binder resin (NPR1520, Miwon Commercial Co., Ltd)

(C) Photopolymerizable Monomer

Dipentaerythritol hexamethacrylate (DPHA, Nippon Kayaku)

(D) Photopolymerization Initiator

Diphenyl (2,4,6-trimethylbenzoyl)phosphine oxide (TPO, Sigma-Aldrich Corporation)

(E) Solvent (E-1) Cyclohexane (Sigma-Aldrich Corporation)

(E-2) Propylene glycol monomethylether acetate (PGMEA, Sigma-Aldrich Corporation)

(F) Scatterer

Titanium oxide dispersion ($TiO_2$ solid content: 20 wt %, Average particle diameter: 200 nm, Ditto Technology)

(G) Monomolecular Compound Including a Thiol Group at the Terminal End

Ethylene glycol di-3-mercaptopropionate (BRUNO BOCK)

(H) Other Additives

Fluorine surfactant (F-554, DIC Co., Ltd.)

TABLE 2

| | | Ex. 1 | Ex. 2 | Ex. 3 | Ex. 4 | Comp. Ex. 1 | Comp. Ex. 2 |
|---|---|---|---|---|---|---|---|
| | | | | | | unit: wt % | |
| (A) Photo-conversion material | | 12 | 12 | 12 | 12 | 12 | 12 |
| (B-1) Metal-containing compound and (B-2) Carboxylic acid-containing binder resin | (B-1-a) | 25 | — | 23 | — | — | — |
| | (B-1-b) | — | 25 | — | 23 | — | — |
| | (B-2-a) | 2 | — | 2 | 2 | 25 | — |
| | (B-2-b) | — | — | — | — | — | 25 |
| (C) Photopolymerizable monomer | | 7.4 | 7.4 | 7.4 | 7.4 | 7.4 | 7.4 |
| (D) Photopolymerization initiator | | 0.7 | 0.7 | 0.7 | 0.7 | 0.7 | 0.7 |
| (E) Solvent | (E-1) | 36 | 36 | 34 | 34 | 36 | 36 |
| | (E-2) | 3 | 3 | 3 | 3 | 3 | 3 |
| (F) Scatterer | | 15 | 15 | 15 | 15 | 15 | 15 |
| (G) Monomolecular compound including a thiol group at the terminal end | | — | — | 2 | 2 | — | — |
| (H) Other additives | | 0.9 | 0.9 | 0.9 | 0.9 | 0.9 | 0.9 |

Evaluation 2: Photo-Conversion Rate and Photo-Conversion Maintenance Rate of Quantum Dot The photosensitive resin compositions according to Example 1 to Example 4, Comparative Example 1, and Comparative Example 2 are respectively coated to be 10

μm-thick single films on a glass substrate using a spin-coater (150 rotations per minute (rpm), Opticoat MS-A150, Mikasa Co., Ltd.) and pre-baked (PRB) on a hot-plate at 100° C. for 2 minutes, and their initial blue photo-conversion rates are measured.

Then, the coated photosensitive resin compositions are radiated by UV with an exposer (Ghi broadband, Ushio Inc.) with an output (power) of 100 mJ/cm$^2$ and post-baked (POB) in a convection clean oven (Jongro Co., Ltd.) at 180° C. for 30 minutes, and their blue photo-conversion rates are measured.

As for the pre-baking and post-baking, a photo-conversion rate from blue light entering from a backlight unit (BLU) into green light and a photo-conversion maintenance rate are evaluated, and the results are shown in Table 3. Herein, the blue photo-conversion rate (green/blue) is measured by using a CAS 140 CT spectrometer equipment and specifically, by putting a bare glass on the blue BLU covered with a diffusing film to first get a reference measured with a detector and then, putting single films obtained by respectively coating the photosensitive resin compositions according to Example 1 to Example 4, Comparative Example 1, and Comparative Example 2 and measuring a blue-to-green converted peak increase amount relative to a blue absorption peak decrease amount. In addition, the photo-conversion maintenance rate is also obtained by measuring how much a photo-conversion rate of the initial PRB step is maintained in the POB step, that is, how much the photo-conversion rate is maintained from the PRB step to the POB step.

TABLE 3

|  | Ex. 1 | Ex. 2 | Ex. 3 | Ex. 4 | Comp. Ex. 1 | Comp. Ex. 2 |
|---|---|---|---|---|---|---|
| Initial photo-conversion rate | 31.4% | 30.8% | 31.6% | 31.2% | 27.4% | 27.1% |
| Photo-conversion rate (%)_after POB once at 180° C., 30 min | 25.3% | 25.1% | 26.4% | 26.7% | 21.1% | 20.9% |

As shown in Table 3, the photosensitive resin compositions according to Example 1 to Example 4 exhibit a small decrease of blue photo-conversion rate and a high photo-conversion maintenance rate during the color filter process compared with the photosensitive resin compositions according to Comparative Example 1 and Comparative Example 2. From the results, the photosensitive resin compositions including the compound including a structural unit represented by Chemical Formula 1 and photo-conversion material such as a quantum dot as constituent elements may be prevented from decreasing a blue photo-conversion rate in every color filter process and thus effectively increase a photo-conversion maintenance rate compared with a photosensitive resin composition including a conventional binder resin, that is the compound without the structural unit represented by Chemical Formula 1 and a photo-conversion material such as a quantum dot. Furthermore, when the photosensitive resin composition according to an embodiment further includes the monomolecular compound including a thiol group at the terminal end, the photo-conversion maintenance rate is further improved.

Evaluation 3: Storage Stability of Quantum Dot and Pattern-Forming Capability

Comparative Example 3

A photosensitive resin composition according to Comparative Example 3 is prepared according to the same method as Example 3, except for using $ZnCl_2$ instead of the metal-containing compound.

[1] Measurement of Storage Stability

Figure 3:
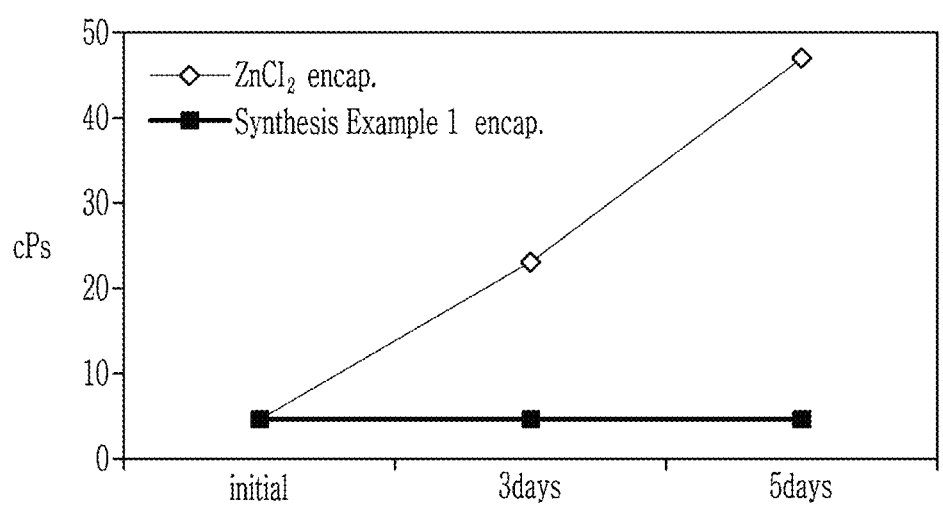
FIG. 3 is a graph showing storage stability of compositions according to Comparative Example 3 and Example 3.

The photosensitive resin compositions prepared in Example 3 and Comparative Example 3 are allowed to stand at room temperature for 5 days to measure viscosity of the compositions. The results are shown in FIG. 3. From the results of FIG. 3, the composition of Example 3 maintains an initial viscosity for five days while the composition of Comparative Example 3 exhibits a remarkable viscosity increase.

[2] Pattern-Forming Capability Test

The photosensitive resin compositions according to Example 3 and Comparative Example 3 are respectively coated to be 10 μm-thick single films on a glass substrate using a spin-coater (150 rpm, Opticoat MS-A150, Mikasa Co., Ltd.) and pre-baked (PRB) on a hot-plate at 100° C. for 2 minutes. Then, the coated photosensitive resin compositions are radiated by UV with an exposer (Ghi Broadband, Ushio Inc.) with an output (power) of 100 mJ/cm$^2$ and post-baked (POB) in a convection clean oven (Jongro Co., Ltd.) at 180° C. for 30 minutes, and pattern profiles of the photosensitive resin films are measured using a scanning electron microscope. The measurement results are shown in FIGS. 4 and 5.

Figure 4:
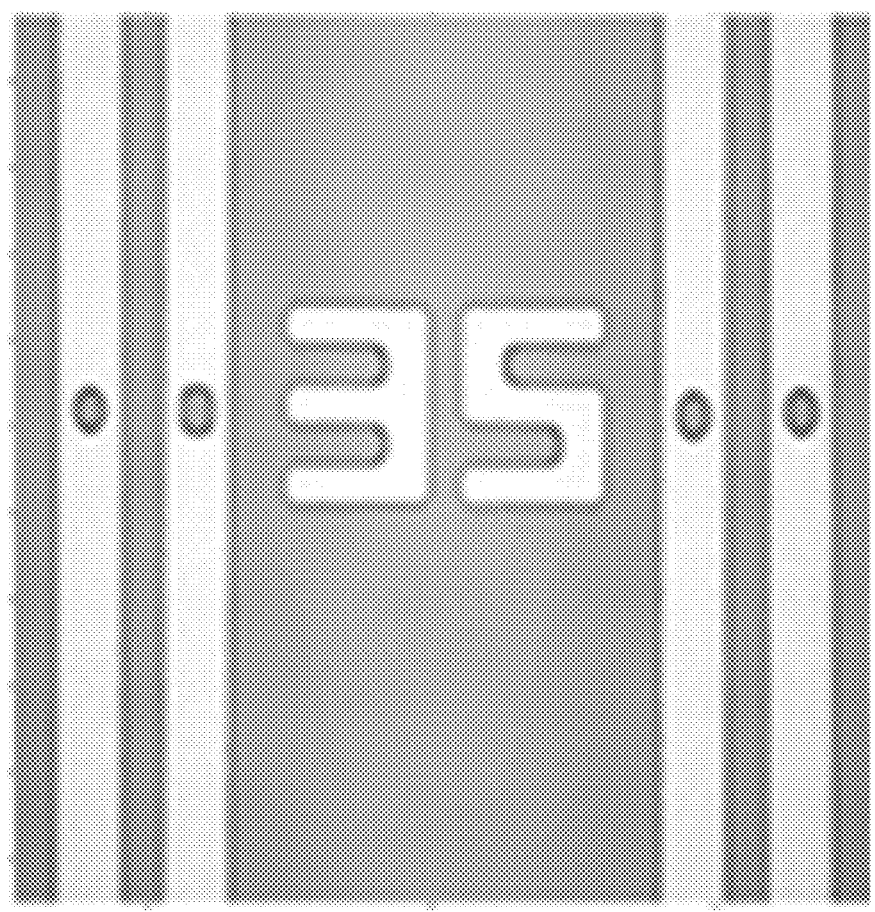
FIG. 4 is a photograph showing a pattern of the complex manufactured by curing the photosensitive resin composition according to Example 3.
Figure 5:
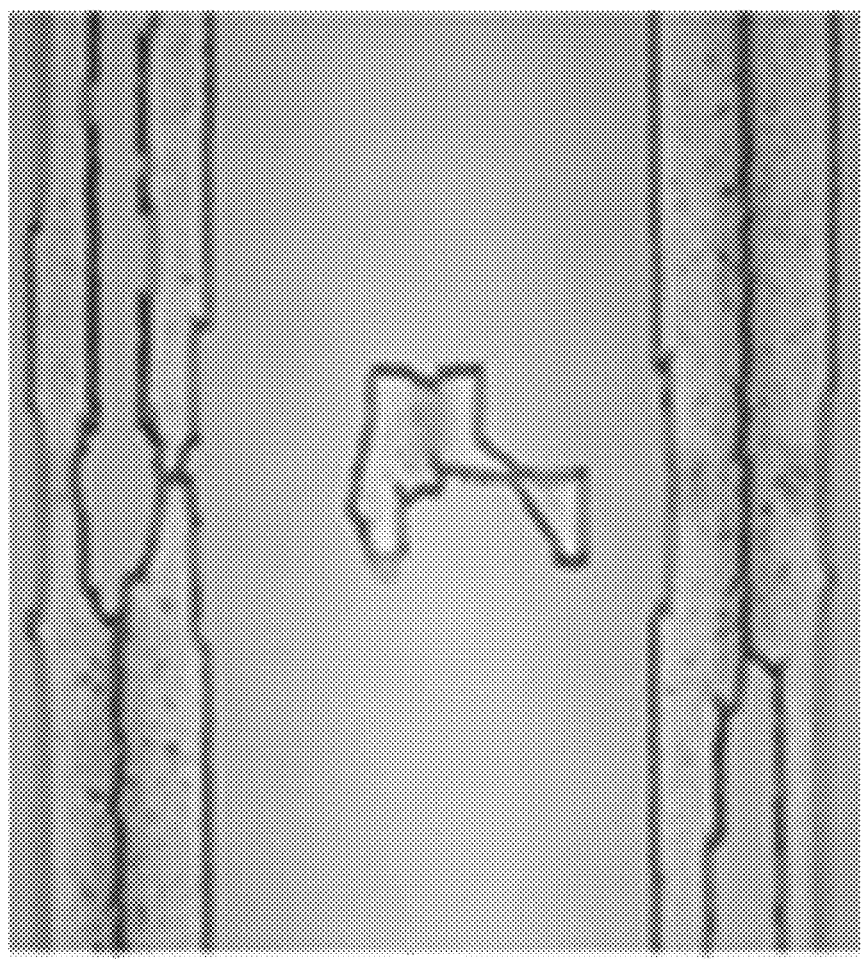
FIG. 5 is a photograph showing a pattern of the complex manufactured by curing the photosensitive resin composition according to Comparative Example 3.

From FIGS. 4 and 5, the photosensitive resin composition of Example 3 exhibits excellent pattern profile compared with that of Comparative Example 3.

While this disclosure has been described in connection with what is presently considered to be practical example embodiments, it is to be understood that the disclosure is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present disclosure in any way.

What is claimed is:

1. A photosensitive resin composition, comprising
   (A) a photo-conversion material;
   (B-1) a metal-containing compound;
   (C) a photopolymerizable monomer;
   (D) a photopolymerization initiator; and
   (E) a solvent,
   wherein the metal-containing compound comprises a moiety represented by *—S-M-S—* wherein M is Zn, Al, Mg, Ca, Sc, Ti, V, Cr, Mn, Fe, Co, Ni, Cu, Ga, Sr, Y, Zr, Nb, Mo, Cd, In, Ba, Au, Hg, or Tl, and
   wherein the metal-containing compound has a weight average molecular weight of greater than or equal to about 1,000 grams per mole and less than or equal to about 15,000 grams per mole.

2. The photosensitive resin composition of claim 1, wherein the metal-containing compound comprises a structure represented by Chemical Formula A:

Chemical Formula A

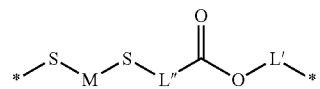

wherein, in Chemical Formula A,

M is Zn, Al, Mg, Ca, Sc, Ti, V, Cr, Mn, Fe, Co, Ni, Cu, Ga, Sr, Y, Zr, Nb, Mo, Cd, In, Ba, Au, Hg, or Tl, and L' and L" are the same or different, and are independently a single bond or a substituted or unsubstituted C1 to C10 alkylene group.

3. The photosensitive resin composition of claim 1, wherein the metal-containing compound comprises a structural unit represented by Chemical Formula B:

Chemical Formula B

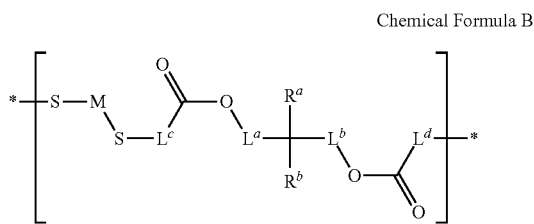

wherein, in Chemical Formula B, $L^a$ to $L^d$ are the same or different, and are each independently a single bond or a substituted or unsubstituted C1 to C10 alkylene group, and $R^a$ and $R^b$ are the same or different, and are independently a hydrogen atom, a substituted or unsubstituted C1 to C10 alkyl group, or represented by Chemical Formula C:

Chemical Formula C

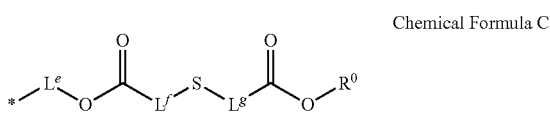

wherein, in Chemical Formula C, $L^e$ to $L^g$ are the same or different, and are each independently a single bond or a substituted or unsubstituted C1 to C10 alkylene group, and $R^0$ is a substituted or unsubstituted C1 to C20 alkyl group, a substituted or unsubstituted C3 to C20 cycloalkyl group, or a substituted or unsubstituted C7 to C20 bicycloalkyl group.

4. The photosensitive resin composition of claim 1, wherein the metal-containing compound comprises a structural unit represented by Chemical Formula 1:

Chemical Formula 1

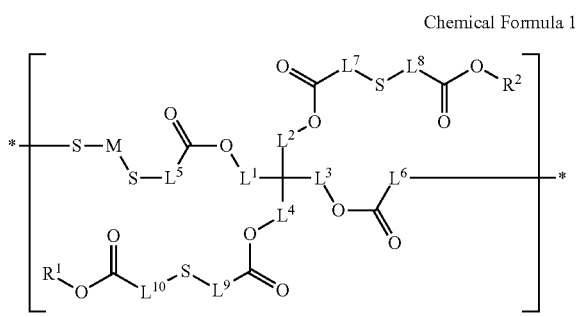

wherein, in Chemical Formula 1, $L^1$ to $L^{10}$ are the same or different, and are each independently a single bond or a substituted or unsubstituted C1 to C10 alkylene group, $R^1$ and $R^2$ are the same or different, and are independently a substituted or unsubstituted C1 to C20 alkyl group, a substituted or unsubstituted C3 to C20 cycloalkyl group, or a substituted or unsubstituted C7 to C20 bicycloalkyl group, and M is Zn, Al, Mg, Ca, Sc, Ti, V, Cr, Mn, Fe, Co, Ni, Cu, Zn, Ga, Sr, Y, Zr, Nb, Mo, Cd, In, Ba, Au, Hg, or Tl.

5. The photosensitive resin composition of claim 1, wherein the M is Zn.

6. The photosensitive resin composition of claim 4, wherein the $R^1$ and $R^2$ are the same or different, and are independently represented by Chemical Formula 2A or Chemical Formula 2B:

Chemical Formula 2A

Chemical Formula 2B

wherein, in Chemical Formula 2A and Chemical Formula 2B, $L^{11}$ is a substituted or unsubstituted C1 to C10 alkylene group, $R^3$ is a substituted or unsubstituted C1 to C20 alkyl group, a substituted or unsubstituted C3 to C20 cycloalkyl group, or a substituted or unsubstituted C7 to C20 bicycloalkyl group, and m1 is an integer of 0 or 1.

7. The photosensitive resin composition of claim 6, wherein the $R^1$ and $R^2$ are the same or different, and are independently represented by one of Chemical Formula 2-1 to Chemical Formula 2-3:

Chemical Formula 2-1

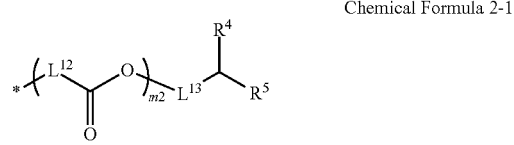

Chemical Formula 2-2

Chemical Formula 2-3

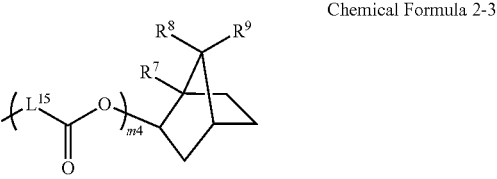

wherein, in Chemical Formula 2-1 to Chemical Formula 2-3, $L^{12}$ to $L^{15}$ are the same or different, and are each independently a substituted or unsubstituted C1 to C10 alkylene group, $R^4$ to $R^9$ are the same or different, and are each independently a substituted or unsubstituted C1 to C20 alkyl group, and m2 to m4 are the same or different, and are each independently an integer of 0 or 1.

8. The photosensitive resin composition of claim 1, wherein the metal-containing compound is represented by Chemical Formula 3:

Chemical Formula 3

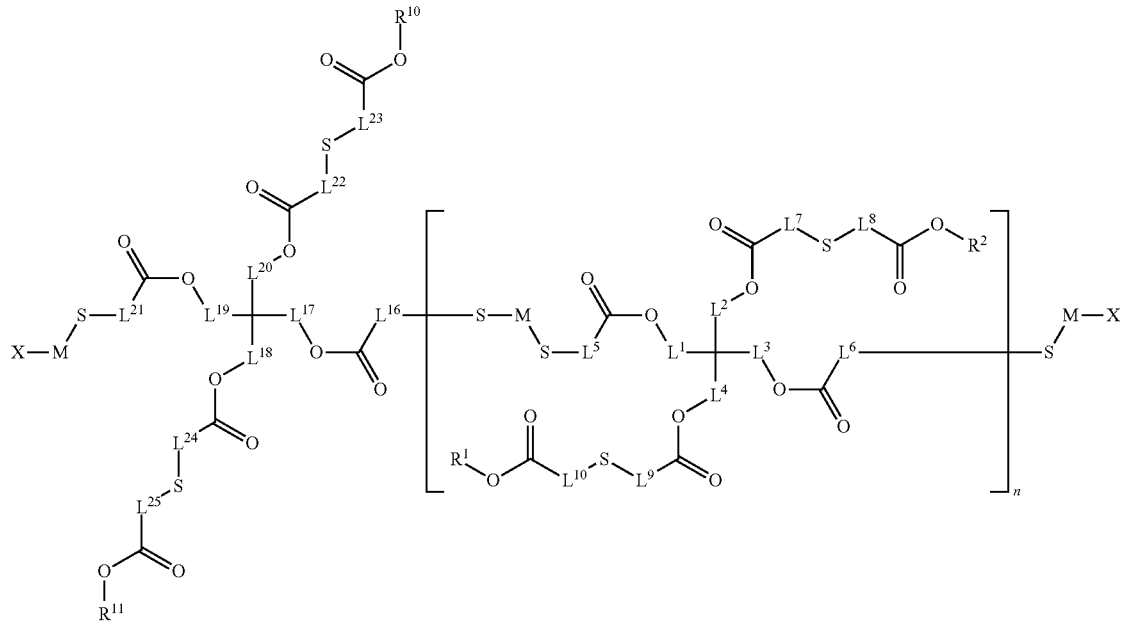

wherein, in Chemical Formula 3, $L^1$ to $L^{10}$ and $L^{16}$ to $L^{25}$ are the same or different, and are each independently a single bond or a substituted or unsubstituted C1 to C10 alkylene group, $R^1$, $R^2$, $R^{10}$, and $R^{11}$ are the same or different, and are each independently a substituted or unsubstituted C1 to C20 alkyl group, a substituted or unsubstituted C3 to C20 cycloalkyl group, or a substituted or unsubstituted C7 to C20 bicycloalkyl group, M is Zn, Al, Mg, Ca, Sc, Ti, V, Cr, Mn, Fe, Co, Ni, Cu, Zn, Ga, Sr, Y, Zr, Nb, Mo, Cd, In, Ba, Au, Hg, or Tl, X is F, Cl, Br, or I, and n is an integer ranging from 1 to 100.

9. The photosensitive resin composition of claim 8, wherein the M is Zn.

10. The photosensitive resin composition of claim 8, wherein the $R^1$, $R^2$, $R^{10}$, and $R^{11}$ are the same or different, and are each independently represented by Chemical Formula 2A or Chemical Formula 2B:

Chemical Formula 2A

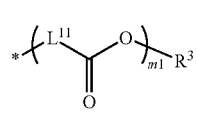

Chemical Formula 2B

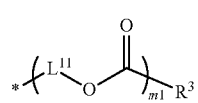

wherein, in Chemical Formula 2A and Chemical Formula 2B, $L^{11}$ is a substituted or unsubstituted C1 to C10 alkylene group, $R^3$ is a substituted or unsubstituted C1 to C20 alkyl group, a substituted or unsubstituted C3 to C20 cycloalkyl group, or a substituted or unsubstituted C7 to C20 bicycloalkyl group, and m1 is an integer of 0 or 1.

11. The photosensitive resin composition of claim 10, wherein the $R^1$, $R^2$, $R^{10}$, and $R^{11}$ are the same or different, and are each independently represented by one of Chemical Formula 2-1 to Chemical Formula 2-3:

Chemical Formula 2-1

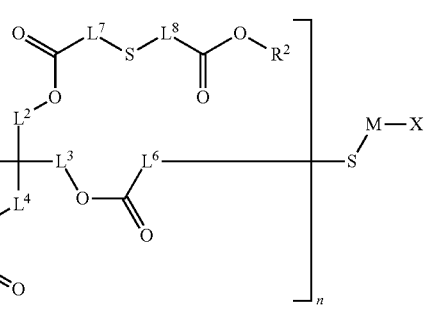

Chemical Formula 2-2

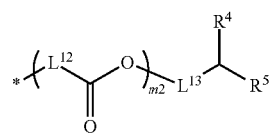

Chemical Formula 2-3

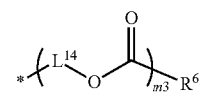

wherein, in Chemical Formula 2-1 to Chemical Formula 2-3, $L^{12}$ to $L^{15}$ are the same or different, and are each independently a substituted or unsubstituted C1 to C10 alkylene group, $R^4$ to $R^9$ are the same or different, and are each independently a substituted or unsubstituted C1 to C10 alkyl group, and m2 to m4 are the same or different, and are each independently an integer of 0 or 1.

12. The photosensitive resin composition of claim 1, wherein the metal-containing compound surrounds a surface of the photo-conversion material.

13. The photosensitive resin composition of claim 1, wherein the photo-conversion material comprises a sulfur atom on a surface of the photo-conversion material and a metal in the metal-containing compound is bound to the sulfur atom on the surface of the photo-conversion material.

14. The photosensitive resin composition of claim 1, wherein the photosensitive resin composition further comprises a carboxylic acid group-containing binder polymer.

15. The photosensitive resin composition of claim 1, wherein the photosensitive resin composition further comprises a scatterer.

16. The photosensitive resin composition of claim 15, wherein the scatterer comprises barium sulfate, calcium carbonate, titanium dioxide, zirconia, or a combination thereof.

17. The photosensitive resin composition of claim 15, wherein the scatterer is included in an amount of about 0.1 percent by weight to about 20 percent by weight based on a total weight of the photosensitive resin composition.

18. The photosensitive resin composition of claim 1, wherein the photosensitive resin composition further comprises an organic thiol compound comprising a thiol group at a terminal end of the organic thiol compound.

19. The photosensitive resin composition of claim 1, wherein the photo-conversion material comprises a quantum dot.

20. The photosensitive resin composition of claim 1, wherein the photosensitive resin composition comprises about 1 percent by weight to about 50 percent by weight of (A) the photo-conversion material;

about 1 percent by weight to about 50 percent by weight of (B-1) the metal-containing compound;

about 0.1 percent by weight to about 30 percent by weight of (C) the photopolymerizable monomer;

about 0.1 percent by weight to about 10 percent by weight of (D) the photopolymerization initiator; and a balance amount of (E) the solvent based on a total weight of the photosensitive resin composition.

21. The photosensitive resin composition of claim 1, wherein the photosensitive resin composition further comprises malonic acid; 3-amino-1,2-propanediol; a silane coupling agent; a leveling agent; a fluorine surfactant; or a combination thereof.

22. The photosensitive resin composition of claim 1, wherein the photosensitive resin composition has an initial viscosity of greater than or equal to about 1 centipoise and less than or equal to about 100 centipoise at 25° C.

23. The photosensitive resin composition of claim 1, wherein the photosensitive resin composition has a viscosity increase of less than or equal to about 10% relative to an initial viscosity after standing at 25° C. for 120 hours.

* * * * *